US012501193B2

(12) United States Patent
Kim et al.

(10) Patent No.: US 12,501,193 B2
(45) Date of Patent: Dec. 16, 2025

(54) APPARATUS

(71) Applicant: LG Display Co., Ltd., Seoul (KR)

(72) Inventors: Juwon Kim, Gyeonggi-do (KR); MooKyoung Hong, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 283 days.

(21) Appl. No.: 17/989,212

(22) Filed: Nov. 17, 2022

(65) Prior Publication Data

US 2023/0209234 A1 Jun. 29, 2023

(30) Foreign Application Priority Data

Dec. 27, 2021 (KR) ........................ 10-2021-0188189

(51) Int. Cl.
*H04R 1/02* (2006.01)

(52) U.S. Cl.
CPC ......... *H04R 1/028* (2013.01); *H04R 2499/15* (2013.01)

(58) Field of Classification Search
CPC ............ H04R 2499/15; H04R 2400/11; H04R 2201/401; H04R 1/06; H04R 1/028; H04R 17/00; H04R 1/403
See application file for complete search history.

(56) References Cited

U.S. PATENT DOCUMENTS

2018/0180925 A1 6/2018 Ahn et al.
2021/0306741 A1 9/2021 Kim et al.

FOREIGN PATENT DOCUMENTS

CN 108241238 A 7/2018
CN 113471356 A 10/2021
CN 113691913 A 11/2021
KR 10-2019-0014794 A 2/2019
KR 10-2019-0121155 A 10/2019

*Primary Examiner* — Kile O Blair

(74) *Attorney, Agent, or Firm* — Birch, Stewart, Kolasch & Birch, LLP

(57) ABSTRACT

An apparatus includes a vibration member including a pad portion, a vibration apparatus vibrating the vibration member, a pad connection member connected to the pad portion, and a vibration signal connection member connecting the vibration apparatus to the pad connection member.

25 Claims, 11 Drawing Sheets

APPARATUS

CROSS-REFERENCE TO RELATED APPLICATIONS

This application claims priority to Korean Patent Application No. 10-2021-0188189 filed on Dec. 27, 2021 in the Republic of Korea, the entire contents of which are hereby expressly incorporated by reference into the present application.

BACKGROUND

Technical Field

The present disclosure relates to an apparatus, and more particularly, to an apparatus in which a signal connection structure between a vibration apparatus and a circuit board is simplified.

Discussion of the Related Art

Apparatuses include a separate speaker or sound apparatus, for providing a sound. When a speaker is provided in (e.g., within) an apparatus, a problem occurs (e.g., a problem can occur) where the design and space arrangement of the apparatus are limited due to a space occupied by the speaker. That is, the speaker can cause the apparatus to be too large and can limit the options for designing the apparatus.

A speaker applied to apparatuses can be, for example, an actuator including a magnet and a coil, e.g., as known in the art. However, when an actuator is applied to an apparatus, there is a drawback where a thickness is thick (e.g., the apparatus becomes too thick). Piezoelectric devices for implementing a thin thickness (e.g., for the apparatus) are attracting much attention.

Due to a fragile characteristic, piezoelectric devices are easily damaged due to an external impact, causing a problem where the reliability of sound reproduction is low. Also, when a speaker, such as a piezoelectric device is applied to a flexible apparatus, there is a problem where damage occurs due to a fragile characteristic.

Moreover, due to a vibration signal cable unload hole (e.g., for receiving a sound input means) of a piezoelectric device, stiffness and heat dissipation quality are reduced, a position of a piezoelectric device is limited, and heat occurs due to a vibration signal cable in driving a piezoelectric device.

Information disclosed in this Background section was already known to the inventors of the inventive concept before achieving the present disclosure or is technical information acquired in the process of achieving the present disclosure. Therefore, it can contain information that does not form the prior art that is already known to the public in this country.

SUMMARY OF THE DISCLOSURE

Accordingly, the inventors have recognized problems described above and have performed various experiments for implementing a vibration apparatus which can enhance the quality of a sound and can enhance a sound pressure level characteristic of the vibration apparatus. Through the various experiments, the inventors have invented a new vibration apparatus and an apparatus including the same, which can enhance the quality of a sound and can enhance a sound pressure level characteristic.

An aspect of the present disclosure is directed to providing a vibration apparatus and an apparatus including the same, which an apparatus which can vibrate an apparatus or a vibration object (e.g., a vibration member) to generate a vibration e.g., vibrations or sound and can enhance a sound characteristic and/or a sound pressure level characteristic of the vibration apparatus.

Another aspect of the present disclosure is directed to providing a vibration apparatus, having a signal connection structure with a simplified structure, and an apparatus including the vibration apparatus.

Additional advantages and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description and claims hereof as well as the appended drawings.

To achieve these and other advantages and in accordance with the purpose of the disclosure, as embodied and broadly described herein, there is provided an apparatus including a vibration member including a pad portion, a vibration apparatus vibrating the vibration member, a pad connection member connected to the pad portion, and a vibration signal connection member connecting the vibration apparatus to the pad connection member.

In another aspect of the present disclosure, there is provided an apparatus including a display panel displaying an image and including a pad portion, a vibration apparatus vibrating the display panel, a pad connection member connected to the pad portion, and a vibration signal connection member between the vibration apparatus and the pad connection member.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

Figure 1:
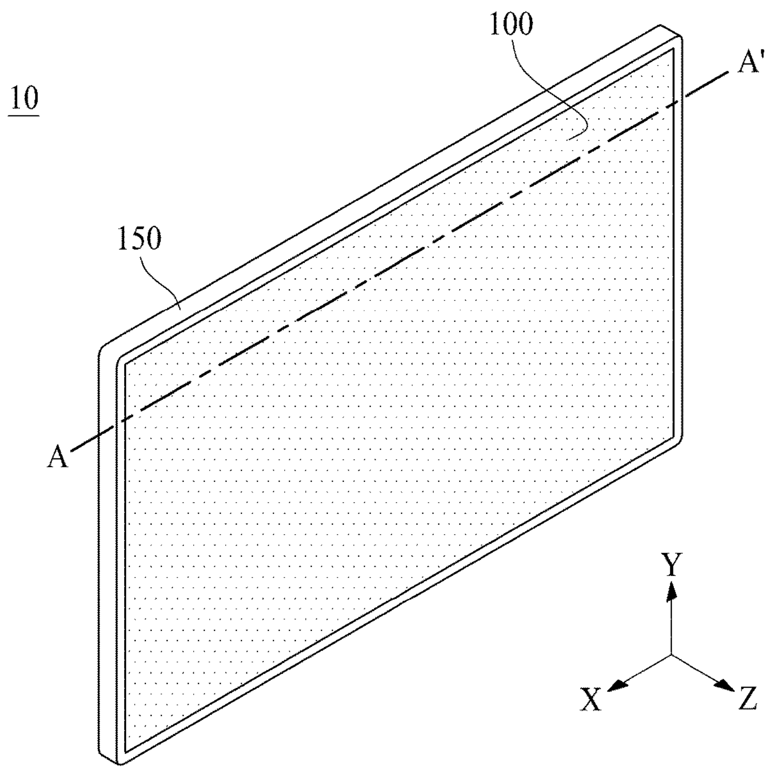
FIG. 1 illustrates an apparatus according to an embodiment of the present disclosure.

Throughout the drawings and the detailed description, unless otherwise described, the same drawing reference numerals should be understood to refer to the same elements, features, and structures. The relative size and depiction of these elements can be exaggerated for clarity, illustration, and convenience.

DETAILED DESCRIPTION OF THE EMBODIMENTS

Advantages and features of the present disclosure, and implementation methods thereof will be clarified through following embodiments described with reference to the accompanying drawings. The present disclosure can, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted.

In a case where 'comprise', 'have', and 'include' described in the present specification are used, another part can be added unless 'only~' is used. The terms of a singular form can include plural forms unless referred to the contrary.

In construing an element, the element is construed as including an error range although there is no explicit description.

In describing a position relationship, for example, when the position relationship is described as 'upon~', 'above~', 'below~' and 'next to~', one or more portions can be arranged between two other portions unless 'just' or 'direct' is used.

In describing a temporal relationship, for example, when the temporal order is described as "after," "subsequent," "next," and "before," a case which is not continuous can be included, unless "just" or "direct" is used.

It will be understood that, although the terms "first", "second", etc. can be used herein to describe various elements, these elements should not be limited by these terms. These terms are only used to partition one element from another. For example, a first element could be termed a second element, and, similarly, a second element could be termed a first element, without departing from the scope of the present disclosure.

The terms "first horizontal axis direction," "second horizontal axis direction," and "vertical axis direction" should not be interpreted only based on a geometrical relationship in which the respective directions are perpendicular to each other, and can be meant as directions having wider directivities within the range within which the components of the present disclosure can operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in co-dependent relationship.

Hereinafter, a preferred embodiment of an apparatus including the same according to an embodiment of the present disclosure will be described in detail with reference to the accompanying drawings. Wherever possible, the same reference numbers will be used throughout the drawings to refer to the same or like parts. Since a scale of each of elements shown in the accompanying drawings is different from an actual scale for convenience of description, the present disclosure is not limited to the shown scale.

The apparatus according to an embodiment of the present disclosure can include a display apparatus, such as an organic light emitting display (OLED) module or a liquid crystal module (LCM) including a display panel and a driver for driving the display panel. Also, the apparatus can include a set device (e.g., a set apparatus) or a set electronic device, such as a notebook computer, a TV, a computer monitor, an equipment apparatus including an automotive apparatus (e.g., navigation system, sound system or instrument cluster) or another type apparatus for vehicles, or a mobile electronic device, such as a smartphone or an electronic pad, which is a complete product (e.g., a final product) including an LCM or an OLED module.

Therefore, in the present disclosure, examples of the apparatus can include a display apparatus itself, such as an LCM or an OLED module, and a set device which is a final consumer device or an application product including the LCM or the OLED module.

In some embodiments, an LCM or an OLED module including a display panel and a driver can be referred to as a display apparatus, and an electronic device which is a final product including an LCM or an OLED module can be referred to as a set device. For example, the display apparatus can include a display panel, such as an LCD or an OLED, and a source printed circuit board (PCB) which is a controller (e.g., hardware-embedded processor) for driving the display panel. The set device can further include a set PCB, which is a set controller electrically connected to the source PCB to overall control the set device.

A display panel applied to an embodiment of the present disclosure can use all types of display panels, such as a liquid crystal display panel (LCD), an organic light emitting diode (OLED) display panel, vertical alignment display panel, in-plane switching display panel, quantum dot LCD, microLED, twisted nematic (TN) panel, and an electroluminescent display panel, but is not limited to a specific display panel which is vibrated by a sound generating apparatus according to an embodiment of the present disclosure to output a sound. Also, a shape or a size of a display panel applied to a display apparatus according to an embodiment of the present disclosure is not limited.

For example, when the display panel is a liquid crystal display panel, the display panel can include a plurality of gate lines, a plurality of data lines, and a plurality of pixels provided in a plurality of intersection areas defined by the gate lines and the data lines. Also, the display panel can include an array substrate which includes a thin film transistor (TFT), which is a switching element for adjusting a light transmittance of each pixel, an upper substrate including a color filter and/or a black matrix, and a liquid crystal layer formed between the array substrate and the upper substrate.

When the display panel is an organic light emitting display panel, the display panel can include a plurality of gate lines, a plurality of data lines, and a plurality of pixels respectively provided in a plurality of pixel areas defined by intersections of the gate lines and the data lines. Also, the display panel can include an array substrate including a thin film transistor (TFT), which is an element for selectively applying a voltage to each of the pixels, an organic light emitting device layer on the array substrate, and an encapsulation substrate disposed on the array substrate to cover the organic light emitting device layer. The encapsulation substrate can protect the TFT and the organic light emitting device layer from an external impact and can prevent water or oxygen from penetrating into the organic light emitting device layer. Also, a layer provided on the array substrate can include an inorganic light emitting layer (for example, a nano-sized material layer, a quantum dot, or the like). As another example, the layer provided on the array substrate can include a micro light emitting diode (e.g., microLED, micro-LED mLED, μLED).

The display panel can further include a backing, such as a metal plate, that is attached on the display panel (e.g., a rear surface of the display panel). However, the present embodiment is not limited to the metal plate, and the display panel can include another structure (for example, another structure including another material, such as a plastic, e.g., acrylic or polymethyl methacrylate (PMMA), polycarbonate (PC), polyethylene (PE), polypropylene (Previously Presented), polyethylene terephthalate (PETE), polyvinyl chloride (PVC), acrylonitrile-butadiene-styrene (ABS), etc.).

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in co-dependent relationship.

Figure 2:
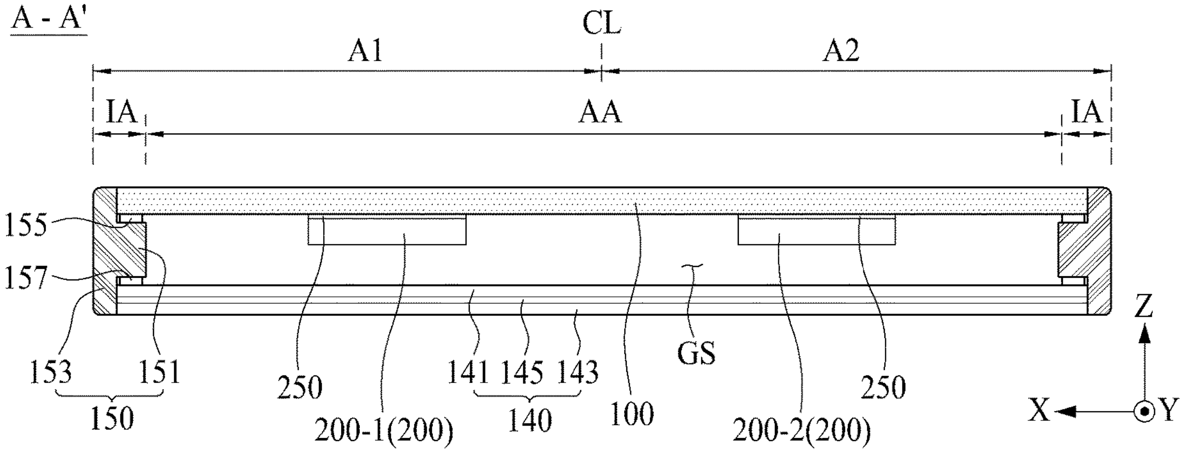
FIG. 2 is a cross-sectional view taken along line A-A' of FIG. 1.

FIG. 1 illustrates an apparatus 10 according to an embodiment of the present disclosure, and FIG. 2 is a cross-sectional view taken along line A-A' of FIG. 1.

With reference to FIGS. 1 and 2, the apparatus 10 (e.g., speaker, piezoelectric speaker, piezo bender, electroacoustic transducer, etc.) according to an embodiment of the present disclosure can include a vibration member 100 and a vibration apparatus 200 which is disposed on a rear surface (e.g., a backside surface) of the vibration member 100.

For example, the vibration member 100 can output a sound on the basis of a vibration of the vibration apparatus 200. The vibration apparatus 200 can output a sound by using the vibration member 100 as a vibration plate. For example, the vibration apparatus 200 can output a sound toward a front surface of the vibration member 100 by using the vibration member 100 as a vibration plate. For example, the vibration apparatus 200 can generate a sound so that the sound travels toward the front surface of the vibration member 100 or toward the front surface of a display panel. The vibration apparatus 200 can vibrate the vibration member 100 to output a sound. For example, the vibration apparatus 200 can directly vibrate the vibration member 100 to output a sound. For example, the vibration member 100 can be a vibration object, a display panel, a vibration plate, or a front member, but embodiments of the present disclosure are not limited thereto. Hereinafter, an embodiment where a vibration member is a display panel will be described.

The vibration member 100 can display an image (for example, an electronic image, a digital image, a still image, or a video image). For example, the vibration member 100 can emit light to display an image. The display panel can be a curved display panel or a flat display panel or all types (e.g., any type) of display panels, such as a liquid crystal display panel, an organic light emitting display panel, a quantum dot light emitting display panel, a micro light emitting diode display panel, and an electrophoresis display panel. For example, the vibration member 100 can be a flexible light emitting display panel, a flexible electrophoresis display panel, a flexible electro-wetting display panel, a flexible micro light emitting diode display panel, or a flexible quantum dot light emitting display panel, but embodiments of the present disclosure are not limited thereto.

The vibration member 100 according to an embodiment of the present disclosure can include a display area (e.g., active area) AA (see FIG. 2) which displays an image on the basis of (e.g., based on) the driving of a plurality of pixels. The vibration member 100 can include a non-display area (e.g., inactive area) IA (see FIG. 2) which surrounds the display area AA, but embodiments of the present disclosure are not limited thereto.

The vibration member 100 according to an embodiment of the present disclosure can include an anode electrode, a cathode electrode, and a light emitting device and can display an image in a type such as a top emission type, a bottom emission type, or a dual emission type, on the basis of a structure of a pixel array layer including a plurality of pixels. In the top emission type, visible light emitted from the pixel array layer can be irradiated a forward direction of a base substrate to allow an image to be displayed, and in the bottom emission type, the visible light emitted from the pixel array layer can be irradiated in a rearward direction of the base substrate to allow an image to be displayed.

The vibration member 100 according to an embodiment of the present disclosure can include a pixel array portion disposed on a substrate. The pixel array portion can include a plurality of pixels which display an image on the basis of a signal supplied through each of signal lines. The signal lines can include a gate line, a data line, and a pixel driving power line, but embodiments of the present disclosure are not limited thereto.

Each of the plurality of pixels can include a pixel circuit layer including a driving TFT provided in a pixel area which is configured by a plurality of gate lines and/or a plurality of data lines, an anode electrode electrically connected to the driving TFT, a light emitting device formed on the anode electrode, and a cathode electrode electrically connected to the light emitting device.

The driving TFT can be provided in a transistor region of each pixel area provided in a substrate. The driving TFT can include a gate electrode, a gate insulation layer, a semiconductor layer, a source electrode, and a drain electrode. The semiconductor layer of the driving TFT can include silicon, such as amorphous silicon (a-Si), polysilicon (poly-Si), or low temperature poly-Si or can include oxide such as indium-gallium-zinc-oxide (IGZO), but embodiments of the present disclosure are not limited thereto.

The anode electrode (e.g., a pixel electrode) can be provided in an opening region provided in each pixel area and can be electrically connected to the driving TFT.

The light emitting device according to an embodiment of the present disclosure can include an organic light emitting device layer provided on the anode electrode. The organic light emitting device layer can be implemented so that pixels emit light of the same color (for example, white light) or emit lights of different colors (for example, red light, green light, and blue light). The cathode electrode (e.g., a common electrode) can be connected to the organic light emitting device layer provided in each pixel area. For example, the organic light emitting device layer can have a stack structure including two or more structures or a single structure including the same color.

In another embodiment of the present disclosure, the organic light emitting device layer can have a stack structure including two or more structures including one or more different colors for each pixel. Two or more structures including one or more different colors can be configured in one or more of blue, red, yellow-green, and green, or a combination thereof, but embodiments of the present disclosure are not limited thereto. An example of the combination can include blue and red, red and yellow-green, red and green, and red/yellow-green/green, but embodiments of the present disclosure are not limited thereto. Also, regardless of a stack order thereof, the combination can be applied. A stack structure (a structure having multiple layers that are stacked on one another) including two or more structures having the same color or one or more different colors can further include a charge generating layer between two or more structures. The charge generating layer can have a PN (p-n) junction structure and can include an N-type charge generating layer and a P-type charge generating layer.

According to another embodiment of the present disclosure, the light emitting device can include a micro light emitting diode device which is electrically connected to each of the anode electrode and the cathode electrode. The micro light emitting diode device can be a light emitting diode implemented as an integrated circuit (IC) type or a chip type. The micro light emitting diode device can include a first terminal electrically connected to the anode electrode and a second terminal electrically connected to the cathode electrode. The cathode electrode can be connected to the second terminal of the micro light emitting diode device provided in each pixel area.

An encapsulation portion can be formed on the substrate to surround the pixel array portion, and thus, can prevent oxygen or water from penetrating into the light emitting device layer of the pixel array portion. The encapsulation portion according to an embodiment of the present disclosure can be formed in a multi-layer structure where an organic material layer and an inorganic material layer are alternately stacked, but embodiments of the present disclosure are not limited thereto. The inorganic material layer can prevent oxygen or water from penetrating into the light emitting device layer of the pixel array portion. The organic material layer can be formed to have a thickness which is relatively thicker than that of the inorganic material layer, so as to cover particles occurring in a manufacturing process. For example, the encapsulation portion can include a first inorganic layer, an organic layer on the first inorganic layer, and a second inorganic layer on the organic layer. The organic layer can be a particle covering layer, but the terms are not limited thereto. A touch panel can be disposed on the encapsulation portion, or can be disposed on a rear surface of the pixel array portion or in the pixel array portion. However, the location of the touch panel is not limited thereto.

The vibration member 100 according to an embodiment of the present disclosure can include a first substrate, a second substrate, and a liquid crystal layer. The first substrate can be an upper substrate or a TFT array substrate. For example, the first substrate can include a pixel array (e.g., a display portion or a display area) including a plurality of pixels provided in a pixel area configured by the plurality of gate lines and/or the plurality of data lines. Each of the plurality of pixels can include a TFT connected to a gate line and/or a data line, a pixel electrode connected to the TFT, and a common electrode which is formed to be adjacent to the pixel electrode and is supplied with a common voltage.

The first substrate can further include a pad portion provided at a first edge (e.g., a non-display portion) thereof and a gate driving circuit provided at a second edge (e.g., a second non-display portion) thereof.

The pad portion can supply the pixel array portion and/or the gate driving circuit with a signal supplied from the outside. For example, the pad portion can include a plurality of data pads connected to the plurality of data lines through a plurality of data link lines and/or a plurality of gate input pads connected to the gate driving circuit through a gate control signal line. For example, a size of the first substrate can be greater than that of the second substrate, but the terms are not limited thereto.

The gate driving circuit can be embedded (e.g., integrated) into the second edge of the first substrate so as to be connected to the plurality of gate lines. For example, the gate driving circuit can be implemented with a shift register (e.g., a type of a digital circuit a using a cascade of a flip-flops a where the output of one flip-flop is connected to the input of the next) including a transistor formed by the same process as a TFT provided in the pixel area. According to another embodiment of the present disclosure, the gate driving circuit may not be embedded into the first substrate and can be provided in a panel driving circuit in an IC type.

The second substrate can be a lower substrate or a color filter array substrate. For example, the second substrate can include a pixel pattern (e.g., a pixel definition pattern) capable of including an opening region overlapping the pixel area formed in the first substrate and a color filter layer formed in the opening region. The second substrate can have a size which is less than that of the first substrate, but embodiments of the present disclosure are not limited thereto. The second substrate can overlap the other (e.g., another) portion, except the first edge, of the first substrate. The second substrate can be bonded to the other portion, except the first edge, of the first substrate by a sealant (e.g., ultraviolet-curable sealant, an epoxy resin, a silicone-based adhesive, or any type of known sealant) with the liquid crystal layer therebetween.

The liquid crystal layer can be disposed between the first substrate and the second substrate. The liquid crystal layer can include liquid crystal where an alignment direction of liquid crystal molecules is changed based on an electrical field generated by the common voltage and a data voltage applied to the pixel electrode for each pixel.

A second polarization member can be attached on a bottom surface (e.g., a lower surface) of the second substrate and can polarize light which is incident from a backlight and travels to the liquid crystal layer. The first polarization member can be attached on a top surface (e.g., an upper surface) of the first substrate and can polarize light which passes through the first substrate and is discharged to the outside.

The vibration member 100 according to an embodiment of the present disclosure can drive the liquid crystal layer with the electrical field which is generated by the common voltage and the data voltage applied to each pixel, thereby displaying an image based on light passing through the liquid crystal layer.

In the vibration member 100 according to another embodiment of the present disclosure, the first substrate can be a color filter array substrate, and the second substrate can be a TFT array substrate. For example, the vibration member 100 according to another embodiment of the present disclosure can have a form where the vibration member 100 according to an embodiment of the present disclosure is vertically reversed. In this case, a pad portion of the vibration member 100 according to another embodiment of the present disclosure can be covered by a separate mechanism.

The vibration member 100 according to another embodiment of the present disclosure can include a bending portion which is bent or curved to have a certain curvature radius or a curved shape.

The bending portion of the vibration member 100 can be implemented at one or more of one edge portion (e.g., a first edge portion) and the other edge portion (e.g., a second edge portion) of the vibration member 100 parallel to each other. The one edge portion and the other edge portion of the vibration member 100 implementing the bending portion can include only the non-display area IA, or can include an edge portion of the display area AA and the non-display area IA. The vibration member 100 including a bending portion implemented by bending of the non-display area IA can have a one-side bezel bending structure or a both-side (e.g., two sided) bezel bending structure. Also, the vibration member 100 including the edge portion of the display area AA and the bending portion implemented by bending of the non-display area IA can have a one-side active bending structure or a both-side active bending structure.

The vibration apparatus 200 can vibrate the vibration member 100 at the rear surface of the vibration member 100, and thus, can provide a user with a sound and/or a haptic feedback on the basis of a vibration of the vibration member 100. The vibration apparatus 200 can be implemented on a rear surface of the vibration member 100 to directly vibrate the vibration member 100. For example, the vibration apparatus 200 can be a vibration generating apparatus, a displacement apparatus, a sound apparatus, or a sound generating apparatus, but the terms are not limited thereto. The vibration apparatus 200 can be provided in plurality and the plurality of vibration apparatuses can be spaced apart from one another in a longitudinal (e.g., first) direction of the vibration member 100, or along the longitudinal direction (e.g., first direction X) and a vertical direction (e.g., second direction Y), where the vertical direction is perpendicular to the longitudinal direction.

In an embodiment of the present disclosure, the vibration apparatus 200 can vibrate based on a vibration driving signal synchronized with an image displayed by the vibration member 100, thereby vibrating the vibration member 100. According to another embodiment of the present disclosure, the vibration apparatus 200 can vibrate based on a haptic feedback signal (e.g., a tactile feedback signal) synchronized with a user touch applied to a touch panel (e.g. a touch sensor layer) which is disposed on the vibration member 100 or embedded into the vibration member 100, and thus, can vibrate the vibration member 100. Accordingly, the vibration member 100 can vibrate based on a vibration of the vibration apparatus 200 to provide a user (e.g., a viewer) with one or more of a sound and a haptic feedback.

The vibration apparatus 200 can vibrate the display panel or the vibration member 100. For example, the vibration apparatus 200 can be implemented on the rear surface of the vibration member 100 to directly vibrate the display panel or the vibration member 100. For example, the vibration apparatus 200 can vibrate the vibration member 100 at the rear surface of the display panel or the vibration member 100, and thus, can provide a user (e.g., a viewer) with a sound and a haptic feedback on the basis of a vibration of the display panel or the vibration member 100.

The vibration apparatus 200 according to an embodiment of the present disclosure can be implemented as a film type (e.g., be formed of a film layer or a plurality of film layers). Because the vibration apparatus 200 is implemented as a film type, the vibration apparatus 200 can have a thickness which is thinner than the vibration member 100, thereby minimizing an increase in thickness of the apparatus caused by the arrangement of the vibration apparatus 200. That is, the vibration apparatus 200 can be provided within an interior space defined by the vibration member 100, a supporting member 140, and a middle frame 150 (described below) disposed between the vibration member 100 and the supporting member 140. For example, the vibration apparatus 200 can be referred to as a sound generating module, a sound generating apparatus, a vibration generating apparatus, a displacement apparatus, a sound apparatus, a film actuator, a film type piezoelectric composite actuator, a film speaker, a film type piezoelectric speaker, or a film type piezoelectric composite speaker, which uses the display panel or the vibration member 100 as a vibration plate or a sound vibration plate, but the terms are not limited thereto.

The vibration apparatus 200 according to an embodiment of the present disclosure can include a ceramic-based material for generating a relatively high vibration, or can include a piezoelectric ceramic having a perovskite-based crystalline structure. The perovskite crystalline structure can have a piezoelectric effect and/or an inverse piezoelectric effect, and can be a plate-shaped structure having orientation. The perovskite crystalline structure can be represented by a chemical formula "$ABO_3$". In the chemical formula, "A" can include a divalent metal element, and "B" can include a tetravalent metal element. For example, in the chemical formula "$ABO_3$", "A" and "B" can be cations, and "O" can be anions. For example, the perovskite crystalline structure can include one or more of lead (II) titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

In a perovskite crystalline structure, a position of a center ion can be changed by an external stress or a magnetic field to vary polarization (e.g., poling), and a piezoelectric effect can be generated based on the variation of the polarization (e.g., poling). In a perovskite crystalline structure including $PbTiO_3$, a position of a Ti ion corresponding to a center ion can be changed to vary polarization (e.g., poling), and thus, a piezoelectric effect can be generated. For example, in the perovskite crystalline structure, a cubic shape having a symmetric structure can be changed to a tetragonal shape, an orthorhombic shape, and a rhombohedral shape each having an unsymmetric structure by using an external stress or a magnetic field, and thus, a piezoelectric effect can be generated. Polarization (e.g., poling) can be high at a morphotropic phase boundary (MPB) of a tetragonal structure and a rhombohedral structure, and polarization (e.g., poling) can be easily realigned, thereby obtaining a high piezoelectric characteristic.

According to an embodiment of the present disclosure, the vibration apparatus 200 can include one or more materials among lead (Pb), zirconium (Zr), titanium (Ti), zinc (Zn), nickel (Ni), and niobium (Nb), but embodiments of the present disclosure are not limited thereto.

The vibration apparatus 200 according to another embodiment of the present disclosure can include single crystalline ceramic and/or polycrystalline ceramic. The single crystalline ceramic can be a material where particles having a single crystal domain having a certain structure are regularly arranged. The polycrystalline ceramic can include irregular particles where various crystal domains are provided.

According to another embodiment of the present disclosure, the vibration apparatus 200 can include a lead zirconate titanate (PZT)-based material, including lead (Pb), zirconium (Zr), and titanium (Ti); or can include a lead zirconate nickel niobate (PZNN)-based material, including lead (Pb), zirconium (Zr), nickel (Ni), and niobium (Nb), but embodiments of the present disclosure are not limited thereto. According to another embodiment of the present disclosure, the vibration apparatus 200 can include one or more of calcium titanate ($CaTiO_3$), barium titanate ($BaTiO_3$), and strontium titanate ($SrTiO_3$), each including no Pb (that is, each being provided with lead Pb), but embodiments of the present disclosure are not limited thereto.

According to another embodiment of the present disclosure, the vibration apparatus 200 can have a piezoelectric deformation coefficient "$d_{33}$" of 1,000 pC/N or more in the thickness direction Z. By having a high piezoelectric deformation coefficient "$d_{33}$", it is possible to provide the vibrating apparatus that can be applied to a display panel or a vibration member (e.g., a vibration object) having a large size or can have a sufficient vibration characteristic or piezoelectric characteristic. For example, in order to have a high piezoelectric deformation coefficient "$d_{33}$", the inorganic material portion can include a PZT-based material ($PbZrTiO_3$) as a main component and can include a softener dopant material doped into A site (Pb) and a relaxor ferroelectric material doped into B site (ZrTi).

The softener dopant material can enhance a piezoelectric characteristic and a dielectric characteristic of the vibration apparatus 200. For example, the softener dopant material can increase the piezoelectric deformation coefficient "$d_{33}$" of the inorganic material portion. The softener dopant material according to an embodiment of the present disclosure can include a dyad element "+2" to a triad element "+3". Morphotropic phase boundary (MPB) can be implemented by adding the softener dopant material to the PZT-based material ($PbZrTiO_3$), and thus, a piezoelectric characteristic and a dielectric characteristic can be enhanced. For example, the softener dopant material can include strontium (Sr), barium (Ba), lanthanum (La), neodymium (Nd), calcium (Ca), yttrium (Y), erbium (Er), or ytterbium (Yb). For example, ions (for example, $Sr^{2+}$, $Ba^{2+}$, $La^{2+}$, $Nd^{3+}$, $Ca^{2+}$, $Y^{3+}$, $Er^{3+}$, and $Yb^{3+}$) of the softener dopant material doped into the PZT-based material ($PbZrTiO_3$) can substitute a portion of lead (Pb) in the PZT-based material ($PbZrTiO_3$), and a substitution rate thereof can be about 2 mol % to about 20 mol %. For example, when the substitution rate is smaller than 2 mol % or greater than 20 mol %, a perovskite crystal structure can be broken, and thus, an electromechanical coupling coefficient "kP" and the piezoelectric deformation coefficient "$d_{33}$" can decrease. When the softener dopant material is substituted, the MPB can be formed, and a piezoelectric characteristic and a dielectric characteristic can be high in the MPB, thereby implementing a vibration apparatus having a high piezoelectric characteristic and a high dielectric characteristic.

According to an embodiment of the present disclosure, the relaxor ferroelectric material (e.g., material that exhibits high electrostriction) doped into the PZT-based material ($PbZrTiO_3$) can enhance an electric deformation characteristic of the inorganic material portion. The relaxor ferroelectric material according to an embodiment of the present disclosure can include a PMN-based material, a PNN-based material, a PZN-based material, or a PIN-based material, but embodiments of the present disclosure are not limited thereto. The PMN-based material can include Pb, Mg, and Nb, and for example, can include $Pb(Mg, Nb)O_3$. The PNN-based material can include Pb, Ni, and Nb, and for example, can include $Pb(Ni, Nb)O_3$. The PZN-based material can include Pb, Zr, and Nb, and for example, can include $Pb(Zn, Nb)O_3$. The PIN-based material can include Pb, In, and Nb, and for example, can include $Pb(In, Nb)O_3$. For example, the relaxor ferroelectric material doped into the PZT-based material ($PbZrTiO_3$) can substitute a portion of each of zirconium (Zr) and titanium (Ti) in the PZT-based material ($PbZrTiO_3$), and a substitution rate thereof can be about 5 mol % to about 25 mol %. For example, when the substitution rate is smaller than 5 mol % or greater than 25 mol %, a perovskite crystal structure can be broken, and thus, the electromechanical coupling coefficient "kP" and the piezoelectric deformation coefficient "$d_{33}$" can decrease.

According to an embodiment of the present disclosure, the vibration apparatus 200 can further include a donor material doped into B site (ZrTi) of the PZT-based material ($PbZrTiO_3$), in order to more enhance a piezoelectric coefficient. For example, the donor material doped into the B site (ZrTi) can include a tetrad element "+4" or a hexad element "+6". For example, the donor material doped into the B site (ZrTi) can include tellurium (Te), germanium (Ge), uranium (U), bismuth (Bi), niobium (Nb), tantalum (Ta), antimony (Sb), or tungsten (W).

The vibration apparatus 200 according to an embodiment of the present disclosure can have a piezoelectric deformation coefficient "$d_{33}$" of 1,000 pC/N or more in the thickness direction Z, and thus, a vibration apparatus having an enhanced vibration characteristic can be implemented. For example, a vibration apparatus having an enhanced vibration characteristic can be implemented in an apparatus or a vibration object having a large area.

According to another embodiment of the present disclosure, the vibration apparatus 200 may not be disposed on the rear surface of the vibration member 100 and can be applied to a non-display panel instead of the display panel. That is, the vibration apparatus 200 can be applied to any surface of the area housing the vibration member 100. For example, the non-display panel can be one or more of wood, plastic, glass, metal, cloth, fiber, rubber, paper, leather, an interior material of a vehicle, an indoor ceiling of a building, and an interior material of an aircraft, but embodiments of the present disclosure are not limited thereto. In this case, the non-display panel can be applied as a vibration plate, and the vibration apparatus 200 can vibrate the non-display panel to output a sound.

For example, an apparatus according to an embodiment of the present disclosure can include a vibration member (e.g., a vibration object) and the vibration apparatus 200 disposed in the vibration member. For example, the vibration member can include a display panel including a pixel displaying an image, or can include a non-display panel. For example, the vibration member can include a display panel including a pixel displaying an image, or can be one or more of wood, plastic, glass, metal, cloth, fiber, rubber, paper, leather, mirror, an interior material of a vehicle, such as the dashboard, the headliner, the truck, etc., a glass window of a vehicle, an indoor ceiling of a building, a glass window of a building, an interior material of a building, an interior material of an aircraft, and a glass window of an aircraft, but embodiments of the present disclosure are not limited thereto. For example, the vibration member can include one or more of a display panel including a pixel configured to display an image, a screen panel on which an image is to be projected from a display apparatus, a lighting panel, a signage panel, a vehicular interior material (e.g., any interior component of a vehicle), a vehicular glass window, a vehicular exterior material (e.g., any exterior component/panel of a vehicle), a ceiling material of a building, an interior material of a building (e.g., any interior component of a building), a glass window of a building, an interior material of an aircraft, a glass window of an aircraft, and mirror, but embodiments of the present disclosure are not limited thereto. For example, the non-display panel can be a light emitting diode lighting panel (e.g., apparatus), an organic light emitting diode lighting panel (e.g., apparatus), or an inorganic light emitting diode lighting panel (e.g., apparatus), but embodiments of the present disclosure are not limited thereto. For example, the vibration member can include a display panel including a pixel displaying an image, or can be one or more of a light emitting diode lighting panel (e.g., apparatus), an organic light emitting diode lighting panel (e.g., apparatus), or an inorganic light emitting diode lighting panel (e.g., apparatus), but embodiments of the present disclosure are not limited thereto.

According to another embodiment of the present disclosure, the vibration member 100 can include a plate, but can otherwise have any shape, such as a circular, oval, triangular or the like. The plate can include a metal material, or can include a single nonmetal material or a complex nonmetal material including one or more of wood, plastic, glass, cloth, fiber, rubber, paper, mirror, and leather, but embodiments of the present disclosure are not limited thereto. According to another embodiment of the present disclosure, the vibration member can include a plate. The plate can include one or more of metal, wood, plastic, ceramic, glass, cloth, fiber, rubber, paper, mirror, and leather, but embodiments of the present disclosure are not limited thereto. For example, the paper can be a cone paper for speakers. For example, the cone paper can be comprised of pulp or a foam plastic, but embodiments of the present disclosure are not limited thereto. For example, the vibration member can be a vibration object, a vibration plate, or a front member, but embodiments of the present disclosure are not limited thereto.

The vibration apparatus 200 according to an embodiment of the present disclosure can be disposed on the rear surface of the vibration member 100 to overlap the display area of the vibration member 100. For example, the vibration apparatus 200 can overlap a display area, corresponding to half or more, of the display area of the vibration member 100. According to another embodiment of the present disclosure, the vibration apparatus 200 can overlap the whole display area of the vibration member 100.

When an alternating current (AC) voltage is applied, the vibration apparatus 200 according to an embodiment of the present disclosure can alternately contract and expand based on an inverse piezoelectric effect and can vibrate the vibration member 100 on the basis of a vibration. According to an embodiment of the present disclosure, the vibration apparatus 200 can vibrate based on a voice signal synchronized with an image displayed by the display panel to vibrate the vibration member 100. That is, the vibration apparatus 200 can be used to produce sound based on an input from the display device or from any other input (e.g., internet-based, cable-based, etc.), where the sound matches a video displayed on the display device. According to another embodiment of the present disclosure, the vibration apparatus 200 can vibrate based on a haptic feedback signal (e.g., a tactile feedback signal) synchronized with a user touch applied to a touch panel (e.g., a touch sensor layer) which is disposed on the vibration member 100 or embedded into the vibration member 100, and thus, can vibrate the vibration member 100. Accordingly, the vibration member 100 can vibrate based on a vibration of the vibration apparatus 200 to provide a user (e.g., a viewer) with one or more of a sound and a haptic feedback.

Therefore, the apparatus according to an embodiment of the present disclosure can output a sound, generated by a vibration of the vibration member 100 based on a vibration of the vibration apparatus 200, in a forward direction of the vibration member 100. Also, the apparatus according to an embodiment of the present disclosure can vibrate a large region of the vibration member 100 by using the vibration apparatus 200 of a film type, thereby more enhancing a sense of sound localization and a sound pressure level characteristic of a sound based on a vibration of the vibration member 100. That is, the vibration apparatus enhances sound localization (e.g., the concentration of sound to a particular area or location) and improves the sound pressure level (e.g., improves the sound volume).

According to an embodiment of the present disclosure, a rear surface (e.g., a backside surface) of the vibration member 100 can include a first region (e.g., a first rear region) A1 and a second region (e.g., a second rear region) A2. For example, on the rear surface of the vibration member 100, the first region A1 can be a left rear region, and the second region A2 can be a right rear region. With a first direction X, the first region A1 and the second region A2 can be horizontally symmetrical with respect to (e.g., about) a center line CL (see FIG. 2) of the vibration member 100, but embodiments of the present disclosure are not limited thereto. For example, each of the first region A1 and the second region A2 can overlap the display area of the vibration member 100, including the active area AA and the non-active area IA of the display area of the vibration member 100.

The vibration apparatus 200 according to an embodiment of the present disclosure can include a first vibration apparatus 200-1 and a second vibration apparatus 200-2, which are disposed on the rear surface of the vibration member 100.

The first vibration apparatus 200-1 can be disposed in the first region A1 of the vibration member 100. For example, the first vibration apparatus 200-1 can be disposed to be close to a center portion or an edge of the first region A1 of the vibration member 100, with respect to the first direction X. The first vibration apparatus 200-1 according to an embodiment of the present disclosure can vibrate the first region A1 of the vibration member 100, and thus, can generate a first vibration sound or a first haptic feedback in the first region A1 of the vibration member 100. For example, the first vibration apparatus 200-1 according to an embodiment of the present disclosure can directly vibrate the first region A1 of the vibration member 100, and thus, can generate the first vibration sound or the first haptic feedback in the first region A1 of the vibration member 100. For example, the first vibration sound can be a left sound (e.g., a sound disposed at a left side of a user standing in front of the vibration member 100). A size of the first vibration apparatus 200-1 according to an embodiment of the present disclosure can be half or less or half or more of a size of the first region A1 on the basis of a characteristic of the first vibration sound or a sound characteristic desired by the apparatus. In another embodiment of the present disclosure, a size of the first vibration apparatus 200-1 can be a size corresponding to the first region A1 of the vibration member 100. For example, a size of the first vibration apparatus 200-1 can be a size which is less than or equal to that of the first region A1 of the vibration member 100.

The second vibration apparatus 200-2 can be disposed in the second region A2 of the vibration member 100. For example, the second vibration apparatus 200-2 can be disposed to be close to a center portion or an edge of the second region A2 of the vibration member 100, with respect to the first direction X. The second vibration apparatus 200-2 according to an embodiment of the present disclosure can vibrate the second region A2 of the vibration member 100, and thus, can generate a second vibration sound or a second haptic feedback in the second region A2 of the vibration member 100. For example, the second vibration apparatus 200-2 according to an embodiment of the present disclosure can directly vibrate the second region A2 of the vibration member 100, and thus, can generate the second vibration sound or the second haptic feedback in the second region A2 of the vibration member 100. For example, the second vibration sound can be a right sound. (e.g., a sound disposed at a right side of a user standing in front of the vibration member 100) A size of the second vibration apparatus 200-2 according to an embodiment of the present disclosure can be half or less or half or more of a size of the second region A2 on the basis of a characteristic of the second vibration sound or a sound characteristic desired by the apparatus. If three or more vibration apparatuses are provided, each can generate a vibration sound or a haptic feedback in different regions of the vibration member 100 to generate sound towards one or more directions. In another embodiment of the present disclosure, a size of the second vibration apparatus 200-2 can be a size corresponding to the second region A2 of the vibration member 100 or the display panel. For example, a size of the second vibration apparatus 200-2 can be a size which is less than or equal to that of the second region A2 of the vibration member 100. Accordingly, the first and second vibration apparatuses 200-1 and 200-2 can have the same size or different sizes, on the basis of a left and right sound characteristic of the apparatus and/or a sound characteristic of the apparatus. Also, the first and second vibration apparatuses 200-1 and 200-2 can be disposed in a left and right symmetrical structure or a left and right asymmetrical structure with respect to the center line CL of the vibration member 100.

Each of the first and second vibration apparatuses 200-1 and 200-2 can include a piezoelectric material (e.g., a vibration portion or a piezoelectric vibration portion) including piezoelectric ceramic having a piezoelectric characteristic, but embodiments of the present disclosure are not limited thereto. For example, each of the first and second vibration apparatuses 200-1 and 200-2 according to an embodiment of the present disclosure can include piezoelectric ceramic having the perovskite crystalline structure, and thus, can be vibrated (e.g., mechanically displaced) in response to an electrical signal applied from the outside. For example, when the vibration driving signal (e.g., the voice signal) is applied, each of the first and second vibration apparatuses 200-1 and 200-2 can alternately and repeatedly contract and/or expand based on an inverse piezoelectric effect of the piezoelectric material (e.g., the vibration portion or the piezoelectric vibration portion), and thus, can be displaced (e.g., vibrated or driven) in the same direction on the basis of a bending phenomenon where a bending direction is alternately changed, whereby a displacement amount (e.g., a bending force) or an amplitude of displacement of the vibration apparatus 200 or/and the vibration member 100 can increase or can be maximized.

A vibration generated by each of the first and second vibration apparatuses 200-1 and 200-2 can vibrate all of the first region (e.g., the first rear region) A1 and the second region (e.g., the second rear region) A2, thereby enhancing satisfaction of a user and increasing a sense of localization of a sound. Also, a contact area (e.g., a panel coverage) between the vibration member 100 and each of the first and second vibration apparatuses 200-1 and 200-2 can increase, and thus, a vibration region of the vibration member 100 can increase, thereby enhancing a sound of a middle-low-pitched sound band generated based on a vibration of the vibration member 100. Also, the vibration apparatus 200 applied to a large-sized apparatus can vibrate all of the vibration member 100 having a large size (e.g., a large area), and thus, a sense of localization of a sound based on a vibration of the vibration member 100 can be more enhanced, thereby realizing an enhanced sound effect. Accordingly, the vibration apparatus 200 according to an embodiment of the present disclosure can be disposed on the rear surface of the vibration member 100 to sufficiently vibrate the vibration member 100 in a vertical (e.g., Z-direction in FIG. 2), or forward, and/or rearward direction, or a plurality of directions, thereby outputting a desired sound in a forward direction of the display apparatus or the apparatus, or outputting the desired sound in a desired direction(s). For example, the vibration apparatus 200 can be disposed on the rear surface of the vibration member 100 to sufficiently vibrate the vibration member 100 in a vertical (e.g., forward and rearward) direction with respect to the first direction X, thereby outputting a desired sound in a forward direction of the display apparatus or the apparatus.

The vibration apparatus 200 according to an embodiment of the present disclosure can further include a connection member 250 for connecting the vibration apparatus 200 to the vibration member 100 and for providing an airgap between the vibration apparatus 200 and the vibration 100 to improve the sound quality/characteristics of the sound generated by the vibration apparatus. For example, the connection member 250 can be disposed between the vibration apparatus 200 and the vibration member 100. For example, the connection member 250 can be disposed between each of the first and second vibration apparatuses 200-1 and 200-2 and the vibration member 100.

The connection member 250 can be disposed between each of the first and second vibration apparatuses 200-1 and 200-2 and the vibration member 100. For example, the vibration apparatus 200 can be connected or coupled to the rear surface of the vibration member 100 by using the connection member 250, and thus, can be supported by or disposed on the rear surface of the vibration member 100.

According to another embodiment of the present disclosure, the connection member 250 can further include a hollow portion provided between the vibration apparatus 200 and the vibration member 100. The hollow portion of the connection member 250 can provide an air gap between the vibration apparatus 200 and the vibration member 100. Based on the air gap, a sound wave (e.g., a sound pressure level) based on a vibration of the vibration apparatus 200 may not be dispersed by the connection member 250 and can concentrate on the vibration member 100, and thus, the loss of a vibration based on the connection member 250 can be minimized, thereby increasing a sound pressure level characteristic and/or a sound characteristic of a sound generated based on a vibration of the vibration member 100. For instance, the connection member 250 can provide improved directional control over the sound generated by the vibration member 100.

The apparatus according to an embodiment of the present disclosure can further include a connection member 250 (e.g., a first connection member) between the vibration apparatus 200 and the vibration member 100 or the display panel.

For example, the connection member 250 can be disposed between the vibration apparatus 200 and the rear surface of the vibration member 100 or the display panel, and thus, can connect or couple the vibration apparatus 200 to the rear surface of the vibration member 100. For example, the vibration apparatus 200 can be connected or coupled to the rear surface of the vibration member 100 or the display panel by using the connection member 250, and thus, can be supported by or disposed on the rear surface of the vibration member 100 or the display panel. For example, the vibration apparatus 200 can be disposed on the rear surface of the vibration member 100 or the display panel by using the connection member 250.

The connection member 250 according to an embodiment of the present disclosure can include a material including an adhesive layer which is good in adhesive force or attaching force with respect to each of the rear surface of the vibration member 100 and the vibration apparatus 200. For example, the connection member 250 can include a foam pad, a double-sided tape, or an adhesive, but embodiments of the present disclosure are not limited thereto. For example, an adhesive layer of the connection member 250 can include epoxy, acryl, silicone, or urethane, but embodiments of the present disclosure are not limited thereto. For example, the adhesive layer of the connection member 250 can include an acryl-based material, having a characteristic where an adhesive force is relatively good (e.g., strong adhesive force) and hardness is high, among acryl and urethane. Accordingly, a vibration of the vibration apparatus 200 can be well transferred to the vibration member 100. Instead of an adhesive member, the connection member 250 can be fixed to the vibration apparatus 200 and the vibration member 100 via a fastener or a plurality of fasteners, welding, soldering, or the like.

The adhesive layer of the connection member 250 can further include an additive, such as a tackifier, a wax component, or an anti-oxidation agent, but embodiments of the present disclosure are not limited thereto. The additive can prevent the connection member 250 from being detached (e.g., stripped) from the vibration member 100 by a vibration of the vibration apparatus 200. For example, the tackifier can be rosin derivative, the wax component can be paraffin wax, and the anti-oxidation agent can be a phenol-based anti-oxidation agent, such as thiolester, but embodiments of the present disclosure are not limited thereto.

According to another embodiment of the present disclosure, the connection member 250 can further include a hollow portion provided between the vibration apparatus 200 and the vibration member 100. The hollow portion of the connection member 250 can provide an air gap between the vibration apparatus 200 and the vibration member 100 or the display panel. Based on the air gap, a sound wave (e.g., a sound pressure level) based on a vibration of the vibration apparatus 200 can not be dispersed by the connection member 250 and can concentrate on the vibration member 100 or the display panel, and thus, the loss of a vibration based on the connection member 250 can be minimized, thereby increasing a sound pressure level characteristic and/or a sound characteristic of a sound generated based on a vibration of the vibration member 100.

The apparatus 10 according to an embodiment of the present disclosure can further include a supporting member 140 which is disposed on the rear surface (e.g., a backside surface) of the vibration member 100.

The supporting member 140 can be disposed on the rear surface of the vibration member 100 or the display panel. For example, the supporting member 140 can cover the whole rear surface of the vibration member 100 or the display panel. For example, the supporting member 140 can include one or more of a glass material, a metal material, and a plastic material. For example, the supporting member 140 can have multiple layers and can be a rear structure, a set structure, a supporting structure, a supporting cover, a rear member, a case, or a housing, but the terms are not limited thereto. The supporting member 140 can be referred to as the other terms, such as a cover bottom, a plate bottom, a back cover, a base frame, a metal frame, a metal chassis, a chassis base, or an m-chassis. For example, the supporting member 140 can be implemented as an arbitrary type frame (e.g., a frame having any shape) or a plate structure disposed on the rear surface of the vibration member 100.

An edge or a sharp corner portion of the supporting member 140 can have an inclined shape or a curved shape through a chamfer process or a corner rounding process. For example, the glass material of the supporting member 140 can be sapphire glass. In another embodiment of the present disclosure, the supporting member 140 including the metal material can include one or more materials of aluminum (Al), an Al alloy, a magnesium (Mg) alloy, stainless-steel, titanium (Ti) and an iron (Fe)-nickel (Ni) alloy.

The supporting member 140 according to an embodiment of the present disclosure can include a first supporting member 141 and a second supporting member 143.

The first supporting member 141 can be disposed between the second supporting member 143 and the rear surface of the vibration member/display panel 100. For example, the first supporting member 141 can be disposed between a front edge (e.g., front surface) of the second supporting member 143 and a rear edge (e.g., rear surface) of the display panel 100. The first supporting member 141 can support one or more of an edge portion of the second supporting member 143 and an edge portion of the display panel 100. In another embodiment of the present disclosure, the first supporting member 141 can cover the rear surface of the display panel 100. For example, the first supporting member 141 can cover the whole rear surface of the display panel 100 or the first supporting member 141 can cover less than the whole rear surface of the display panel 100. For example, the first supporting member 141 can be a member which covers the whole rear surface of the display panel 100. For example, the first supporting member 141 can include one or more of a glass/ceramic material, a metal material, and a plastic material. For example, the first supporting member 141 can be an inner plate, a first rear structure, a first supporting structure, a first supporting cover, a first back cover, a first rear member, an internal plate, or an internal cover, but the terms are not limited thereto. As another example, the first supporting member 141 can be omitted.

The first supporting member 141 can be apart (e.g., spaced apart) from the rearmost surface of the vibration member 100 with the gap space GS therebetween, or can be apart from the vibration apparatus 200. For example, the gap space GS can be referred to as an air gap, a vibration space, and a sound sounding box, but the terms are not limited thereto.

The second supporting member 143 can be disposed on a rear (e.g., back) surface of the first supporting member 141. The second supporting member 143 can be a member which covers the whole rear surface of the display panel 100 or the second supporting member 143 can be a member which covers less than the whole rear surface of the display panel 100. For example, the second supporting member 143 can include one or more of a glass/ceramic material, a metal material, and a plastic material. For example, the second supporting member 143 can be an outer plate, a rear plate, a back plate, a back cover, a rear cover, a second rear structure, a second supporting structure, a second supporting cover, a second back cover, a second rear member, an external plate, or an external cover, but the terms are not limited thereto.

The supporting member 140 according to an embodiment of the present disclosure can further include a connection member 145 (e.g., a second connection member).

The connection member 145 can be disposed between (e.g., directly between) the first supporting member 141 and the second supporting member 143. For example, the first supporting member 141 can be coupled or connected to the second supporting member 143 by using the connection member 145. For example, the connection member 145 can be an adhesive resin, a double-sided tape, or a double-sided adhesive foam pad, but embodiments of the present disclosure are not limited thereto. For example, the connection member 145 can have elasticity for impact absorption, but embodiments of the present disclosure are not limited thereto. For example, the connection member 145 can be disposed in a whole region between the first supporting member 141 and the second supporting member 143. In another embodiment of the present disclosure, the connection member 145 can be formed in a mesh structure (e.g., a grid structure having holes between grid lines) including an air gap between the first supporting member 141 and the second supporting member 143. That is, the connection member 145 can provided an air gap between the first supporting member 141 and the second support member 143 by being in the form of a porous material or a material having a grid or mesh structure.

The apparatus according to an embodiment of the present disclosure can further include a middle frame 150. The middle frame 150 can be disposed between a rear edge of the display panel or the vibration member 100 and a front edge of the supporting member 140. The middle frame 150 can support one or more of an edge portion of the vibration member 100 and an edge portion of the supporting member 140. For instance, the middle frame 150 can support side surfaces of the vibration member 100 and the supporting member 140, including an entire longitudinal side surface of the vibration member 100 and the supporting member 140. The middle frame 150 can surround one or more of lateral surfaces of each of the vibration member 100 and the supporting member 140. The middle frame 150 can provide the gap space GS between the display panel 100 and the supporting member 140 and can attach the display panel 100 to the supporting member 140. The middle frame 150 can be referred to as a middle cabinet, a middle cover, a middle chassis, a connection member, a frame, a frame member, a middle member, or a lateral cover member, but the terms are not limited thereto.

The middle frame 150 according to an embodiment of the present disclosure can include a first supporting portion 151 and a second supporting portion 153. For example, the first supporting portion 151 can be a supporting portion, but the terms are not limited thereto. For example, the second supporting portion 153 can be a sidewall portion, but the terms are not limited thereto.

The first supporting portion 151 can be disposed between a rear edge of the vibration member 100 and a front edge of the supporting member 140, and thus, can provide a gap space GS between the vibration member 100 and the supporting member 140. The first support portion 151 can extend in the longitudinal direction (in the X direction). A front surface of the first supporting portion 151 can be coupled or connected to the rear edge of the vibration member 100 by a first adhesive member 155. A rear surface of the first supporting portion 151 can be coupled or connected to the front edge (e.g., front surface) of the supporting member 140 by a second adhesive member 157. For example, the first supporting portion 151 can have a single picture frame structure having a tetragonal shape or a picture frame structure having a plurality of division bar forms, but embodiments of the present disclosure are not limited thereto.

The second supporting portion 153 can be disposed in parallel with a thickness direction (e.g., third direction) Z of the apparatus. For example, the second supporting portion 153 can be vertically coupled to an outer surface of the first supporting portion 151 in parallel with the thickness direction Z of the apparatus. The second supporting portion 153 can surround one or more of an outer surface of the vibration member 100 and an outer surface of the supporting member 140, thereby protecting the outer surface of each of the vibration member 100 and the supporting member 140. The first supporting portion 151 can protrude from an inner surface of the second supporting portion 153 to the gap space GS between the vibration member 100 and the supporting member 140.

The apparatus according to an embodiment of the present disclosure can include a panel connection member (e.g., a connection member) instead of the middle frame 150.

The panel connection member can be disposed between the rear edge of the vibration member 100 and the front edge of the supporting member 140, and thus, can provide a gap space GS between the vibration member 100 and the supporting member 140. The panel connection member can be disposed between the rear edge of the vibration member 100 and the front edge of the supporting member 140 and can attach the vibration member 100 on the supporting member 140. For example, the panel connection member can be implemented with a double-sided tape, a single-sided tape, or a double-sided adhesive foam pad, but embodiments of the present disclosure are not limited thereto. For example, an adhesive layer of the panel connection member can include epoxy, acryl, silicone, or urethane, but embodiments of the present disclosure are not limited thereto. For example, in order to minimize the transfer of a vibration of the vibration member 100 to the supporting member 140, the adhesive layer of the panel connection member can include a urethane-based material, having a relatively ductile characteristic compared to acryl, among acryl and urethane. Accordingly, a vibration of the vibration member 100 transferred to the supporting member 140 can be minimized.

According to another embodiment of the present disclosure, in the apparatus according to an embodiment of the present disclosure, the middle frame 150 can be omitted. Instead of the middle frame 150, a panel connection member or an adhesive can be provided. According to another embodiment of the present disclosure, instead of the middle frame 150, a partition can be provided.

Figure 3:
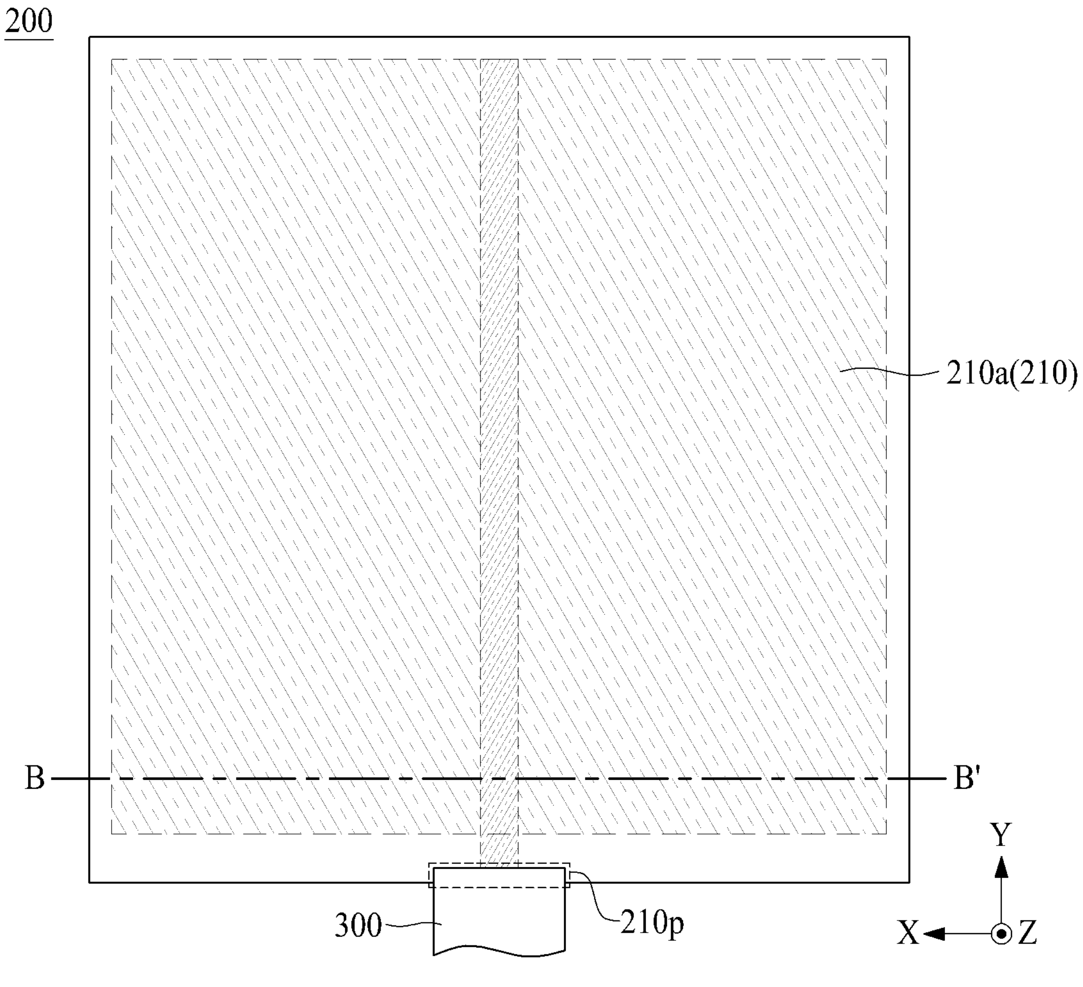
FIG. 3 illustrates a vibration apparatus according to an embodiment of the present disclosure.
Figure 4:
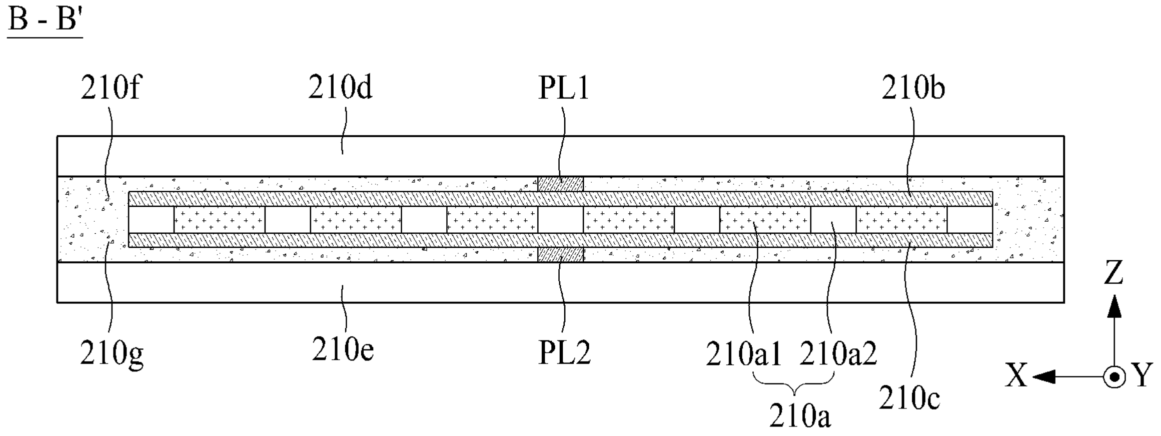
FIG. 4 is a cross-sectional view taken along line B-B' of FIG. 3.

FIG. 3 illustrates a vibration apparatus 200 according to an embodiment of the present disclosure, FIG. 4 is a cross-sectional view taken along line B-B' of FIG. 3, and FIGS. 5A to 5E are perspective views illustrating a vibration portion according to an embodiment of the present disclosure.

With reference to FIGS. 3, 4, and 5, the vibration apparatus 200 according to an embodiment of the present disclosure can be referred to as a flexible vibration structure, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film type piezoelectric composite actuator, a film speaker, a film type piezoelectric speaker, or a film type piezoelectric composite speaker, but the terms are not limited thereto.

The vibration apparatus 200 according to an embodiment of the present disclosure can include a vibration portion 210*a* (e.g., vibration device 200), a first electrode portion 210*b*, and a second electrode portion 210*c*.

The vibration portion 210*a* can include a piezoelectric material (e.g., an electroactive material) having a piezoelectric effect. For example, the piezoelectric material can have a characteristic where pressure or twisting is applied to a crystalline structure by an external force, a potential difference occurs due to dielectric polarization (e.g., poling) caused by a relative position change of a positive (+) ion and a negative (−) ion, and a vibration is generated by an electric field based on a voltage applied thereto. The vibration portion 210*a* can be referred to as the terms such as a vibration layer, a piezoelectric layer, a piezoelectric material layer, an electroactive layer, a vibration portion, a piezoelectric material portion, an electroactive portion, a piezoelectric structure, a piezoelectric composite layer, a piezoelectric composite, or a piezoelectric ceramic composite, but the terms are not limited thereto. The vibration portion 210*a* can include a transparent conductive material, a semitransparent conductive material, or an opaque conductive material and can be transparent, semitransparent, or opaque.

Figure 5A:
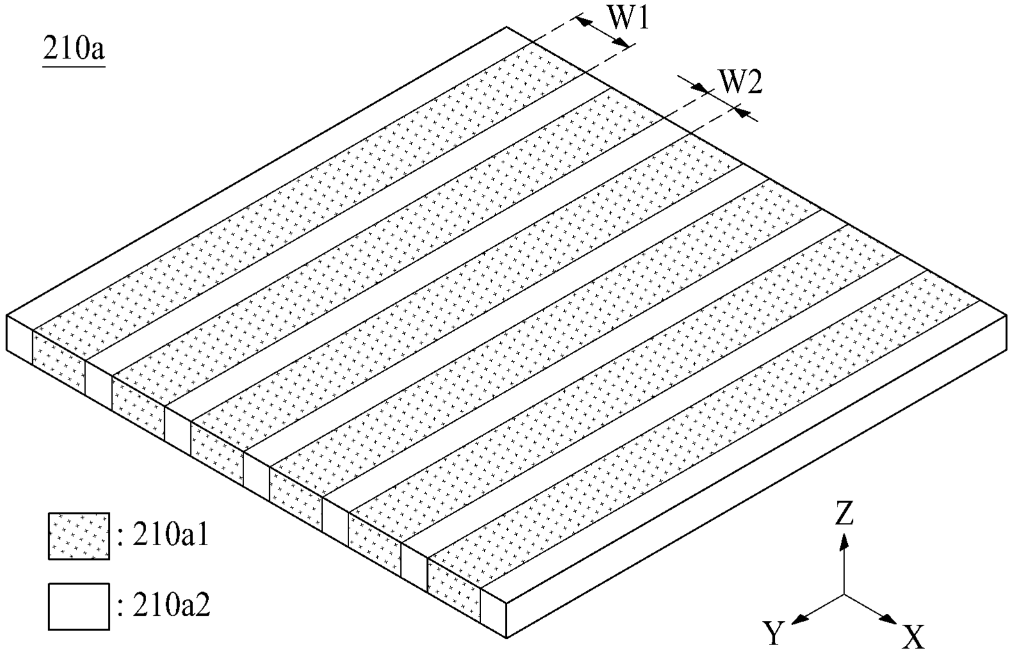
FIGS. 5A to 5E are perspective views illustrating a vibration portion according to an embodiment of the present disclosure.

The vibration portion 210*a* according to an embodiment of the present disclosure, as illustrated in FIG. 5A, can include a plurality of first portions 210*a*1 and a plurality of second portions 210*a*2. For example, the plurality of first portions 210*a*1 and the plurality of second portions 210*a*2 can be alternately and repeatedly arranged in a first direction X or a second direction Y. For example, the first direction X can be a widthwise direction of the vibration portion 210*a* and the second direction Y can be a lengthwise direction of the vibration portion 210*a* intersecting with the first direction X, but embodiments of the present disclosure are not limited thereto and the first direction X can be a lengthwise direction of the vibration portion 210*a* and the second direction Y can be a widthwise direction of the vibration portion 210*a*.

Each of the plurality of first portions 210*a*1 can include an inorganic material portion. The inorganic material portion can include a piezoelectric material, a composite piezoelectric material, or an electroactive material, which has a piezoelectric effect.

Each of the plurality of first portions 210*a*1 can include a ceramic-based material for generating a relatively high vibration, or can include a piezoelectric ceramic having a perovskite-based crystalline structure. The perovskite crystalline structure can have a piezoelectric effect and/or an inverse piezoelectric effect, and can be a plate-shaped structure having orientation. The perovskite crystalline structure can be represented by a chemical formula "$ABO_3$". In the chemical formula, "A" can include a divalent metal element, and "B" can include a tetravalent metal element. For example, in the chemical formula "$ABO_3$", "A" and "B" can be cations, and "O" can be anions. For example, the first portions 210*a*1 can include one or more of lead(II) titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

According to an embodiment of the present disclosure, the vibration portion 210*a* can include one or more materials among lead (Pb), zirconium (Zr), titanium (Ti), zinc (Zn), nickel (Ni), and niobium (Nb), but embodiments of the present disclosure are not limited thereto.

The vibration portion 210*a* according to another embodiment of the present disclosure can include single crystalline ceramic and/or polycrystalline ceramic. The single crystalline ceramic can be a material where particles having a single crystal domain having a certain structure are regularly arranged. The polycrystalline ceramic can include irregular particles where various crystal domains are provided.

According to another embodiment of the present disclosure, the vibration portion 210*a* can include a lead zirconate titanate (PZT)-based material, including lead (Pb), zirconium (Zr), and titanium (Ti); or can include a lead zirconate nickel niobate (PZNN)-based material, including lead (Pb), zirconium (Zr), nickel (Ni), and niobium (Nb), but embodiments of the present disclosure are not limited thereto. According to another embodiment of the present disclosure, the vibration portion 210*a* can include one or more of calcium titanate ($CaTiO_3$), $BaTiO_3$, and $SrTiO_3$, each including no Pb, but embodiments of the present disclosure are not limited thereto.

Each of the plurality of first portions 210*a*1 according to an embodiment of the present disclosure can be disposed between two adjacent second portions 210*a*2 of the plurality of second portions 210*a*2, and moreover, can have a first width W1 parallel to the first direction X or the second direction Y and can have a length parallel to the second direction Y or the first direction X. Each of the plurality of second portions 210*a*2 can have a second width W2 parallel to the first direction X the second direction Y and can have a length parallel to the second direction Y the first direction X. The first width W1 can be the same as or different from the second width W2. For example, the first width W1 can be greater than the second width W2. For example, the first portion 210*a*1 and the second portion 210*a*2 can include a line shape or a stripe shape having the same size or different sizes. Alternatively, the first portion 210*a*1 and the second portion 210*a*2 can have a rectangular shape, a square shape, or any other shape. Accordingly, the vibration portion 210*a* can have a 2-2 composite structure having a piezoelectric characteristic of a 2-2 vibration mode, and thus, can have a resonance frequency of 20 kHz or less, but embodiments of the present disclosure are not limited thereto. For example, the resonance frequency of the vibration portion 210*a* can vary based on one or more of a shape, a length, and a thickness. For example, the first portions 210*a*1 and the second portions 210*a*2 can be alternatively provided, such that a first portion 210*a*1 is followed by a second portion 210*a*2, and so on.

In the vibration portion 210*a*, the plurality of first portions 210*a*1 and the plurality of second portions 210*a*2 can be disposed (e.g., arranged) in parallel on the same plane (e.g., the same layer). Each of the plurality of second portions 210*a*2 can be configured to fill a gap between two adjacent first portions 210*a*1, and thus, each of the plurality of second portions 210*a*2 can be connected to or attached on an adjacent first portion 210*a*1. Accordingly, the vibration portion 210*a* can extend by a desired size or length on the basis of lateral coupling (e.g., connection) of the first portion 210*a*1 and the second portion 210*a*2.

In the vibration portion 210*a*, the width W2 of each of the plurality of second portions 210*a*2 can decrease progressively in a direction from a center portion of the vibration portion 210*a* or the vibration device 210 to both edge portions (e.g., both ends) thereof.

According to an embodiment of the present disclosure, when the vibration portion 210*a* or the vibration device 210 vibrates in a vertical direction Z (e.g., a thickness direction or third direction), a second portion 210*a*2 having a largest width W2 among the plurality of second portions 210*a*2 can be disposed at a portion on which a largest stress concentrates. When the vibration portion 210*a* or the vibration device 210 vibrates in the vertical direction Z, a second portion 210*a*2 having a smallest width W2 among the plurality of second portions 210*a*2 can be disposed at a portion where a relatively smallest stress occurs. For example, the second portion 210*a*2 having the largest width W2 among the plurality of second portions 210*a*2 can be disposed at a center portion of the vibration portion 210*a*, and the second portion 210*a*2 having the smallest width W2 among the plurality of second portions 210*a*2 can be disposed at both edge portions of the vibration portion 210*a*. Accordingly, when the vibration portion 210*a* or the vibration device 210 vibrates in the vertical direction Z, an overlap of a resonance frequency or interference of a sound wave occurring at a portion on which a largest stress concentrates can be minimized, and thus, dip of a sound pressure level occurring in a low-pitched sound band can be reduced. For example, the flatness of a sound characteristic can be a magnitude of a deviation between a highest sound pressure level and a lowest sound pressure level.

In the vibration portion 210*a*, the plurality of first portions 210*a*1 can have different sizes (e.g., widths, lengths and/or heights). For example, a size (e.g., a width) of each of the plurality of first portions 210*a*1 can decrease or increase progressively in a direction from the center portion of the vibration portion 210*a* or the vibration device 210 to both edge portions (e.g., both ends) thereof. Therefore, a sound pressure level characteristic of a sound of the vibration portion 210*a* can be enhanced by various unique vibration frequencies based on vibrations of the plurality of first portions 210*a*1 having different sizes, and a reproduction band of a sound can extend.

Each of the plurality of second portions 210*a*2 can be disposed between the plurality of first portions 210*a*1. Therefore, in the vibration portion 210*a* or the vibration device 210, vibration energy based on a link in a unit lattice of the first portion 210*a*1 can be increased by the second portion 210*a*2, and thus, a vibration characteristic can increase and a piezoelectric characteristic and flexibility can be secured. For example, the second portion 210*a*2 can include one of an epoxy-based polymer, an acrylic-based polymer, and a silicone-based polymer, but embodiments of the present disclosure are not limited thereto.

Each of the plurality of second portions 210*a*2 according to an embodiment of the present disclosure can be configured with an organic material portion. For example, the organic material portion can be disposed between two adjacent inorganic material portions, and thus, can absorb an impact applied to the inorganic material portion (e.g., the first portion) and can release a stress concentrating on the inorganic material portion, thereby enhancing the durability of the vibration portion 210*a* or the vibration device 210 and realizing the flexibility of the vibration portion 210*a* or the vibration device 210.

The second portion 210*a*2 according to an embodiment of the present disclosure can have a modulus and viscoelasticity that are lower than those of the first portion 210*a*1, and thus, the second portion 210*a*2 can enhance the reliability of the first portion 210*a*1 vulnerable to an impact due to a fragile characteristic of the first portion 210*a*1. For example, the second portion 210*a*2 can include a material having a loss coefficient of about 0.01 to about 1 and a modulus of about 0.1 [GPa] to about 10 [GPa].

The organic material portion included in the second portion 210*a*2 can include an organic material, an organic polymer, an organic piezoelectric material, or an organic non-piezoelectric material having a flexible characteristic compared to the inorganic material portion which is the first portion 210*a*1. For example, the second portion 210*a*2 can be referred to as an adhesive portion, a flexible portion, a bending portion, a damping portion, or a ductile portion, or the like, but embodiments of the present disclosure are not limited thereto.

The plurality of first portions 210*a*1 and the plurality of second portions 210*a*2 can be disposed on (e.g., connected to) the same plane, and thus, the vibration portion 210*a* according to an embodiment of the present embodiment can have a single thin film form. For example, the vibration portion 210*a* can have a structure where the plurality of first portions 210*a*1 are connected to one side thereof. For example, the vibration portion 210*a* can have a structure where the plurality of first portions 210*a*1 are connected in all of the vibration portion 210*a*. For example, the vibration portion 210*a* can be vibrated in a vertical direction by the first portion 210*a*1 having a vibration characteristic and can be bent in a curved shape by the second portion 210*a*2 having flexibility. Also, in the vibration portion 210*a* according to an embodiment of the present disclosure, a size of the first portion 210*a*1 and a size of the second portion 210*a*2 can be adjusted based on a piezoelectric characteristic and flexibility needed for the vibration portion 210*a* or the vibration device 210. For example, in the vibration portion 210*a* requiring a piezoelectric characteristic rather than flexibility, a size of the first portion 210*a*1 can be adjusted to be greater than that of the second portion 210*a*2. In another embodiment of the present disclosure, in the vibration portion 210*a* requiring flexibility rather than a piezoelectric characteristic, a size of the second portion 210*a*2 can be adjusted to be greater than that of the first portion 210*a*1. Accordingly, a size of the vibration portion 210*a* can be adjusted based on a desired characteristic, and thus, the vibration portion 210*a* can be easily designed.

The first electrode portion 210*b* can be disposed on a first surface (e.g., an upper surface) of the vibration portion 210*a*. The first electrode portion 210*b* can be disposed on or coupled to a first surface of each of the plurality of first portions 210*a*1 and a first surface of each of the plurality of second portions 210*a*2 in common and can be electrically connected to the first surface of each of the plurality of first portions 210*a*1. For example, the first electrode portion 210*b* can have a single electrode form disposed on the whole first surface of the vibration portion 210*a*. For example, the first electrode portion 210*b* can have substantially the same shape as the vibration portion 210*a*, but embodiments of the present disclosure are not limited thereto.

The first electrode portion 210*b* according to an embodiment of the present disclosure can include a transparent conductive material, a semitransparent conductive material, or an opaque conductive material. For example, the transparent conductive material or the semitransparent conductive material can include indium tin oxide (ITO) or indium zinc oxide (IZO), but embodiments of the present disclosure are not limited thereto. The opaque conductive material can include aluminum (Al), silver (Ag), copper (Cu), gold (Au), molybdenum (Mo), magnesium (Mg), or an alloy thereof, but embodiments of the present disclosure are not limited thereto.

The second electrode portion 210*c* can be disposed on a second surface (e.g., a rear surface), which differs from (e.g., opposite to) the first surface, of the vibration portion 210*a*. The second electrode portion 210*c* can be disposed on or coupled to a second surface of each of the plurality of first portions 210*a*1 and a second surface of each of the plurality of second portions 210*a*2 in common and can be electrically connected to the second surface of each of the plurality of first portions 210*a*1. For example, the second electrode portion 210*c* can have a single electrode form disposed on the whole second surface of the vibration portion 210*a* or less than the whole second surface of the vibration portion 210*a*. For example, the second electrode portion 210*c* can have the same shape as the vibration portion 210*a*, but embodiments of the present disclosure are not limited thereto and the second electrode portion 210*c* can have a different shape from the vibration portion 210*a*. The second electrode portion 210*c* according to an embodiment of the present disclosure can include a transparent conductive material, a semitransparent conductive material, or an opaque conductive material. For example, the second electrode portion 210*c* can include the same material as that of the first electrode portion 210*b*, and the second electrode portion 210*c* can include different materials from that of the first electrode portion 210*b*, but embodiments of the present disclosure are not limited thereto. As another example, the second electrode portion 210*c* can include a material which differs from that of the first electrode portion 210*b*.

The vibration portion 210*a* can be polarized (e.g., poling) by a certain voltage applied to the first electrode portion 210*b* and the second electrode portion 210*c* in a certain temperature atmosphere or a temperature atmosphere which is changed from a high temperature to a room temperature, but embodiments of the present disclosure are not limited thereto. For example, the vibration portion 210*a* can alternately and repeatedly contract and expand based on an inverse piezoelectric effect based on a sound signal (e.g., a voice signal) applied from the outside to the first electrode portion 210*b* and the second electrode portion 210*c*, and thus, the vibration portion can vibrate. For example, the vibration portion 210*a* can vibrate based on a vertical-direction vibration and a planar-direction vibration by using the first electrode portion 210*b* and the second electrode portion 210*c*. A displacement of a vibration member (e.g., a vibration plate or a vibration object) can increase based on contraction and expansion of the vibration portion 210*a* in the planar direction, and thus, a vibration can be more enhanced.

The vibration device 210 according to an embodiment of the present disclosure can further include a first cover member 210*d* and a second cover member 210*e*.

The first cover member 210*d* can be disposed on a first surface of the vibration device 210. For example, the first cover member 210*d* can be configured to cover the first electrode portion 210*b*. Accordingly, the first cover member 210*d* can protect the first electrode portion 210*b*.

The second cover member 210*e* can be disposed on a second surface of the vibration device 210, the second surface can be opposite to the first surface of the vibration device 210. For example, the second cover member 210*e* can be configured to cover the second electrode portion 210*c*. Accordingly, the second cover member 210*e* can protect the second electrode portion 210*c*.

Each of the first cover member 210*d* and the second cover member 210*e* according to an embodiment of the present disclosure can include one or more materials of plastic, fiber, and wood, but embodiments of the present disclosure are not limited thereto. For example, the first cover member 210*d* and the second cover member 210*e* can include the same material or different materials. For example, the first cover member 210*d* and the second cover member 210*e* can be a polyimide film or a polyethylene terephthalate film, but embodiments of the present disclosure are not limited thereto.

The first cover member 210*d* according to an embodiment of the present disclosure can be connected or coupled to the first electrode portion 210*b* by using a first adhesive layer 210*f*, which can be an ultraviolet-curable sealant, an epoxy resin, a silicone-based adhesive, or any type of known sealant. For example, the first cover member 210*d* can be connected or coupled to the first electrode portion 210*b* through a film laminating process using the first adhesive layer 210*f*.

The second cover member 210*e* according to an embodiment of the present disclosure can be connected or coupled to the second electrode portion 210*c* by using a second adhesive layer 210*g*. For example, the second cover member 210*e* can be connected or coupled to the second electrode portion 210*c* through a film laminating process using the second adhesive layer 210*g*. The first adhesive layer 210*f* can be adhesively attached to a surface of the second adhesive layer 210*g*.

The first adhesive layer 210*f* can be disposed between the first electrode portion 210*b* and the first cover member 210*d*. The second adhesive layer 210*g* can be disposed between the second electrode portion 210*c* and the second cover member 210*e*. For example, the first adhesive layer 210*f* and the second adhesive layer 210*g* can be provided between the first cover member 210*d* and the second cover member 210*e* to surround the vibration portion 210*a*, the first electrode portion 210*b*, and the second electrode portion 210*c*. For example, the first adhesive layer 210*f* and the second adhesive layer 210*g* can be provided between the first cover member 131*d* and the second cover member 131*e* to fully surround the vibration portion 210*a*, the first electrode portion 210*b*, and the second electrode portion 210*c*. For example, the vibration portion 210*a*, the first electrode portion 210*b*, and the second electrode portion 210*c* can be buried or embedded between the first adhesive layer 210*f* and the second adhesive layer 210*g*.

Each of the first adhesive layer 210*f* and the second adhesive layer 210*g* according to an embodiment of the present disclosure can include an electrical insulation material which has adhesive properties and is capable of compression and decompression. For example, each of the first adhesive layer 210*f* and the second adhesive layer 210*g* can include epoxy resin, acrylic resin, silicone resin, and urethane resin, but embodiments of the present disclosure are not limited thereto.

One of the first cover member 210*d* and the second cover member 210*e* can be adhered or coupled to a vibration member (e.g., a vibration plate or a vibration object) by using an adhesive member.

According to an embodiment of the present disclosure, one of the first cover member 210*d* and the second cover member 210*e* can be adhered or coupled to a vibration member (e.g., a vibration plate or a vibration object) by using an adhesive member.

The vibration device 210 according to an embodiment of the present disclosure can further include a first power supply line PL1 which is disposed in the first cover member 210*d*, a second power supply line PL2 which is disposed in the second cover member 210*e*, and a pad portion 210*p* (see FIG. 11) which is electrically connected to the first power supply line PL1 and the second power supply line PL2.

The first power supply line PL1 can be disposed between the first electrode portion 210*b* and the first cover member 210*d* and can be electrically connected to the first electrode portion 210*b*. The first power supply line PL1 can extend long in a second direction Y and can be electrically connected to a center portion of the first electrode portion 210*b*. In an embodiment, the first power supply line PL1 can be electrically connected to the first electrode portion 210*b* by using an anisotropic conductive film. In another embodiment, the first power supply line PL1 can be electrically connected to the first electrode portion 210*b* through a conductive material (e.g., particles) included in the first adhesive layer 210*f*.

The second power supply line PL2 can be disposed between the second electrode portion 210*c* and the second cover member 210*e* and can be electrically connected to the second electrode portion 210*c*. The second power supply line PL2 can extend long in the second direction Y and can be electrically connected to a center portion of the second electrode portion 210*c*. In an embodiment, the second power supply line PL2 can be electrically connected to the second electrode portion 210*c* by using an anisotropic conductive film. In another embodiment, the second power supply line PL2 can be electrically connected to the second electrode portion 210*g* through a conductive material (e.g., particles) included in the second adhesive layer 210*g*.

The pad portion 210*p* can be provided at one edge portion of one of the first cover member 210*d* and the second cover member 210*e* so as to be electrically connected to one side (e.g., one end) of each of the first power supply line PL1 and the second power supply line PL2.

The pad portion 210*p* according to an embodiment of the present disclosure can include a first pad electrode which is electrically connected to one end of the first power supply line PL1 and a second pad electrode which is electrically connected to one end of the second power supply line PL2.

The first pad electrode can be disposed at one edge portion of one of the first cover member 210*d* and the second cover member 210*e* and can be connected to one end (e.g., a first end) of the first power supply line PL1. For example, the first pad electrode can pass through one of the first cover member 210*d* and the second cover member 210*e* and can be electrically connected to one end of the first power supply line PL1. For example, the first pad electrode can pass through both of the first cover member 210*d* and the second cover member 210*e* and can be electrically connected to one end of the first power supply line PL1.

The second pad electrode can be disposed in parallel with the first pad electrode and can be connected to one end of the second power supply line PL2. For example, the second pad electrode can pass through one of the first cover member 210*d* and the second cover member 210*e* and can be electrically connected to one end of the second power supply line PL2. For example, the second pad electrode can pass through both of the first cover member 210*d* and the second cover member 210*e* and can be electrically connected to one end of the second power supply line PL2.

According to an embodiment of the present disclosure, each of the first power supply line PL1, the second power supply line PL2, and the pad portion 210*p* can be (e.g., be configured to be) transparent, semitransparent, or opaque.

The pad portion 210*p* according to an embodiment of the present disclosure can be electrically connected to a vibration signal connection member 300 e.g., a vibration signal cable or sound input cable).

The vibration signal connection member 300 can be electrically connected to the pad portion 210*p* which is disposed in the vibration device 210 and can supply the vibration device 210 with a vibration driving signal (e.g., a sound signal) provided from a sound processing circuit. The vibration signal connection member 300 according to an embodiment can include a first terminal which is electrically connected to a first pad electrode of the pad portion 210*p* and a second terminal which is electrically connected to a second pad electrode of the pad portion 210*p*.

The vibration signal connection member 300 according to an embodiment of the present disclosure can be implemented as a film type (for example, chip on film (COF)) where a signal line is provided therein and can be bonded (e.g., coupled) and electrically connected to the pad portion 210*p* by using a tape automated bonding (TAB) type. For example, the vibration signal connection member 300 can include a line layer, a lower film which is coupled to a first surface of the line layer by using an adhesive, an upper film which is coupled to a second surface of the line layer by using an adhesive, and a plurality of contact pads and first and second terminals disposed on the upper film and connected to the line layer.

The line layer can include a base film, a plurality of signal lines formed on one or more of a front surface and a bottom surface (e.g., a lower surface) of the base film, and first and second driving signal supply lines formed on one or more of a front surface and a bottom surface (e.g., a lower surface) of the base film. For example, the plurality of signal lines and the first and second driving signal supply lines can include a conductive material including copper (Cu), aluminum (Al), silver (Ag), gold (Au), or an alloy material of Cu and Ag, or an alloy of two or more of Cu, Al, Ag and Au but embodiments of the present disclosure are not limited thereto.

Each of the plurality of contact pads can be disposed on one of the lower film and the upper film and can be selectively connected to the plurality of signal lines and the first and second driving signal supply lines through a via hole.

The first and second terminals can be electrically connected to the first and second pad electrodes of the pad portion 210*p* provided in the vibration device 210, respectively.

In another embodiment, the vibration signal connection member 300 can be configured in a form where the first power supply line PL1 and the second power supply line PL2 extend along with some elements (for example, the first and second cover members 210*d* and 210*e*) of the vibration device 210. In another embodiment, the vibration signal connection member 300 can be a signal cable and can be configured as a flexible printed circuit cable, a flexible flat cable, a single-sided flexible printed circuit, a single-sided flexible printed circuit board (PCB), a flexible multi-layer printed circuit, or a flexible multi-layer PCB, but embodiments of the present disclosure are not limited thereto. For example, the signal cable can be configured to be transparent, semitransparent, or opaque.

The sound processing circuit can generate an alternating current (AC) vibration driving signal including a first vibration driving signal and a second vibration driving signal on the basis of sound data provided from an external sound data generating circuit. The first vibration driving signal can be one of a positive (+) vibration driving signal and a negative (−) vibration driving signal, and the second vibration driving signal can be one of the positive (+) vibration driving signal and the negative (−) vibration driving signal. For example, the first vibration driving signal can be supplied to the first electrode portion 210*b* through the first terminal of the vibration signal connection member 300, the first pad electrode of the pad portion 210*p*, and the first power supply line PL1. The second vibration driving signal can be supplied to the second electrode portion 210*c* through the second terminal of the vibration signal connection member 300, the second pad electrode of the pad portion 210*p*, and the second power supply line PL2.

According to an embodiment, the vibration signal connection member 300 can be configured to be transparent, semitransparent, or opaque.

The vibration device 210 according to an embodiment of the present disclosure can be implemented as a thin film type because the first portion 210*a*1 having a piezoelectric characteristic and the second portion 210*a*2 having flexibility are alternately repeated and connected, and thus, can be bent in a shape corresponding to a shape of a vibration member or a vibration object. For example, when the vibration device 210 is connected or coupled to a vibration member including various curved portions by using the connection member 250 (e.g., an adhesive member), the vibration device 210 can be bent in a curved shape along a shape of the curved portion of the vibration member 210, and a reduction in reliability caused by damage or breakdown may not occur even when being bent in a curved shape.

FIGS. 5A to 5E are perspective views illustrating a vibration portion according to an embodiment of the present disclosure.

Figure 5B:
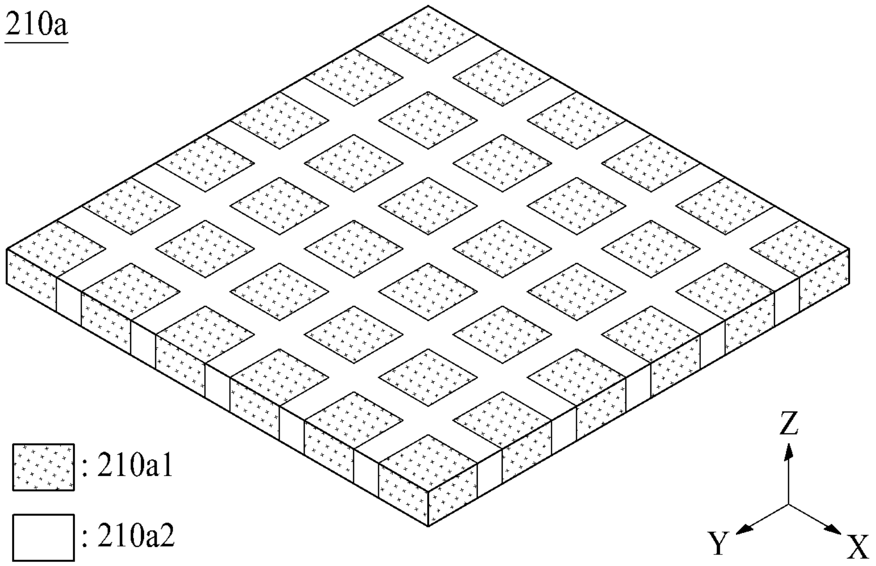

With reference to FIG. 5B, a vibration portion 210*a* according to another embodiment of the present disclosure can include a plurality of first portions 210*a*1, which are apart from one another in a first direction X and a second direction Y, and a second portion 210*a*2 disposed between the plurality of first portions 210*a*1. The plurality of first portions 210*a*1 can have a square shape or a rectangular shape, and the second portion 210*a*2 can form a grid structure between the plurality of first portions 210*a*1. For example, each of the first portions 210*a*1 can be spaced apart from each other by a single second portion 210*a*2.

The plurality of first portions 210*a*1 can be arranged apart from one another in each of the first direction X and the second direction Y. For example, the plurality of first portions 210*a*1 can be arranged in a lattice form to have a hexahedral shape (e.g., having six faces) having the same size or having a different size. Each of the plurality of first portions 210*a*1 can include substantially the same piezoelectric material as that of the first portion 210*a*1 described above with reference to FIGS. 3, 4, and 5A, and thus, like reference numerals refer to like elements and repeated descriptions thereof are omitted.

The second portion 210*a*2 can be arranged between the plurality of first portions 210*a*1 in each of the first direction X and the second direction Y. The second portion 210*a*2 can be configured to fill a gap between two adjacent first portions 210*a*1 or surround each of the plurality of first portions 210*a*1, and thus, can be connected or adhered to an adjacent first portion 210*a*1. According to an embodiment of the present disclosure, a width of the second portion 210*a*2 disposed between two first portions 210*a*1 adjacent to each other in the first direction X can be the same as or different from that of the first portion 210*a*1, and a width of the second portion 210*a*2 disposed between two first portions 210*a*1 adjacent to each other in the second direction Y can be the same as or different from that of the first portion 210*a*1. The second portion 210*a*2 can include substantially the same piezoelectric material as that of the second portion 210*a*2 described above with reference to FIGS. 3, 4, and 5A, and thus, like reference numerals refer to like elements and repeated descriptions thereof are omitted. For example, a part of the second portion 210*a*2 disposed between the first portions 210*a*1 can have less width than the first portions al.

As described above, the vibration portion 210*a* according to another embodiment of the present disclosure can have a 1-3 composite structure having a piezoelectric characteristic of a 1-3 vibration mode, and thus, can have a resonance frequency of 30 MHz or less, but embodiments of the present disclosure are not limited thereto. For example, the resonance frequency of the vibration portion 210*a* can vary based on one or more of a shape, a length, and a thickness.

Figure 5C:
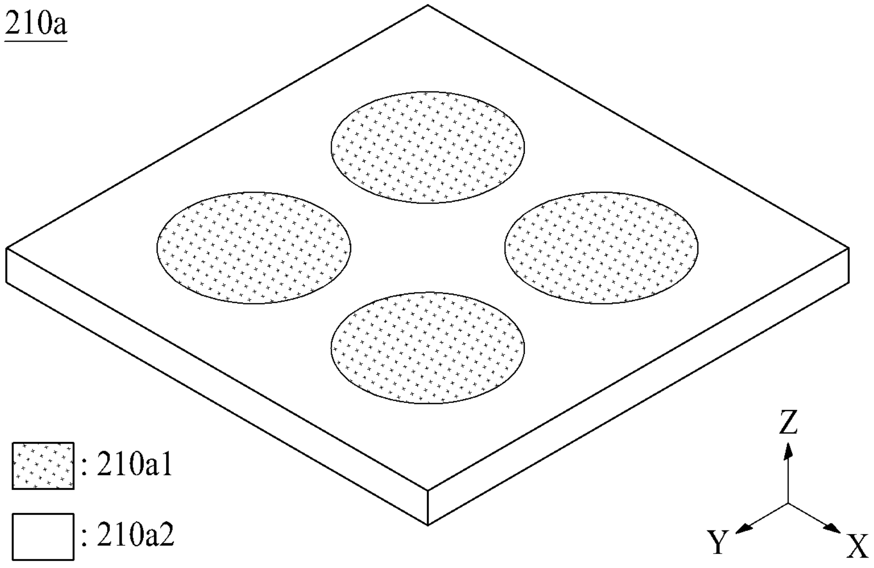

With reference to FIG. 5C, a vibration portion 210*a* according to another embodiment of the present disclosure can include a plurality of first portions 210*a*1, which are apart from one another in a first direction X and a second direction Y, and a second portion 210*a*2 disposed between the plurality of first portions 210*a*1.

Each of the plurality of first portions 210*a*1 can have a circular-shaped planar structure. For example, each of the plurality of first portions 210*a*1 can have a circular plate shape, but embodiments of the present disclosure are not limited thereto. For example, each of the plurality of first portions 210*a*1 can have a dot shape such as an oval shape, a polygonal shape, or a donut shape (e.g., a circular shape with a center hole). Each of the plurality of first portions 210*a*1 can include substantially the same piezoelectric material as that of the first portion 210*a*1 described above with reference to FIGS. 3, 4, and 5A, and thus, like reference numerals refer to like elements and repeated descriptions thereof are omitted.

The second portion 210*a*2 can be arranged between the plurality of first portions 210*a*1 in each of the first direction X and the second direction Y, and the second portion 210*a*2 can be provided in singular (e.g., one unified second portion 210*a*2 can be utilized to surround one or more first portions 210*a*1). The second portion 210*a*2 can be configured to surround each of the plurality of first portions 210*a*1, and thus, can be connected or adhered to a lateral surface of each of the plurality of first portions 210_a_1. Each of the plurality of first portions 210_a_1 and the second portion 210_a_2 can be disposed (e.g., arranged) in parallel on the same plane (e.g., the same layer). The second portion 210_a_2 can include substantially the same organic material as that of the second portion 210_a_2 described above with reference to FIGS. 3, 4, and 5A, and thus, like reference numerals refer to like elements and repeated descriptions thereof are omitted.

Figure 5D:
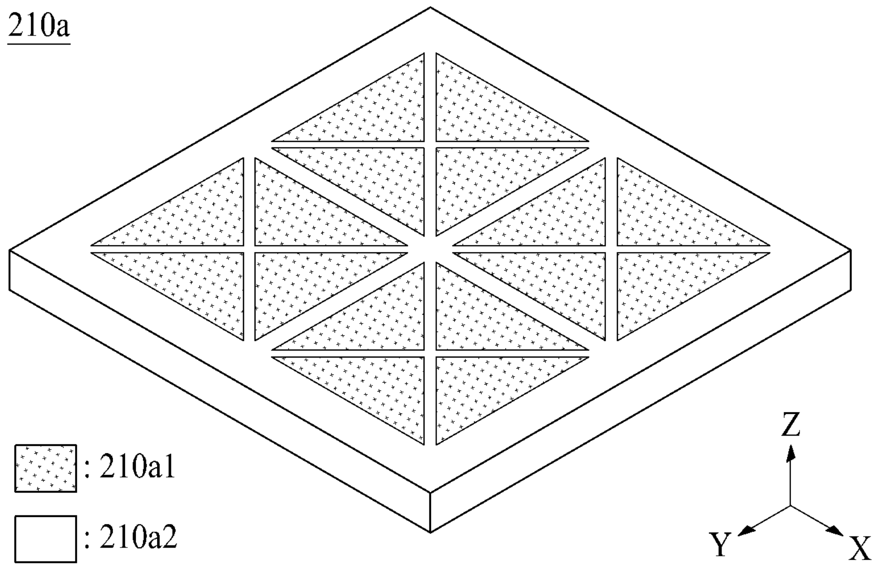

With reference to FIG. 5D, in a vibration device 210 according to another embodiment of the present disclosure, a vibration portion 210_a_ can include a plurality of first portions 210_a_1, which are apart from one another in a first direction X and a second direction Y, and a second portion 210_a_2 disposed between the plurality of first portions 210_a_1.

Each of the plurality of first portions 210_a_1 can have a triangular-shaped planar structure, and can be in a group of four first portions 210_a_1, where the group forms a square or rectangle, with spaces between the first portions 210_a_1 of the group. Two or more groups can be provided, with a second portion 210_a_2 forming the space between the first portions within each group, and forming a space between the groups. For example, each of the plurality of first portions 210_a_1 can have a triangular plate shape. Each of the plurality of first portions 210_a_1 can include substantially the same piezoelectric material as that of the first portion 210_a_1 described above with reference to FIGS. 3, 4, and 5A, and thus, like reference numerals refer to like elements and repeated descriptions thereof are omitted.

According to an embodiment of the present disclosure, four adjacent first portions 210_a_1 of the plurality of first portions 210_a_1 can be arranged adjacent to one another to form a tetragonal shape (e.g., a square shape). A vertex of each of the four adjacent first portions 210_a_1 forming a tetragonal shape can be disposed adjacent to a center portion (e.g., a middle portion) of a tetragonal shape.

The second portion 210_a_2 can be arranged between the plurality of first portions 210_a_1 in each of the first direction X and the second direction Y. The second portion 210_a_2 can be configured to surround each of the plurality of first portions 210_a_1, and thus, can be connected or adhered to a lateral surface of each of the plurality of first portions 210_a_1. Each of the plurality of first portions 210_a_1 and the second portion 210_a_2 can be disposed (e.g., arranged) in parallel on the same plane (e.g., the same layer). The second portion 210_a_2 can include substantially the same organic material as that of the second portion 210_a_2 described above with reference to FIGS. 3, 4, and 5A, and thus, like reference numerals refer to like elements and repeated descriptions thereof are omitted.

Figure 5E:
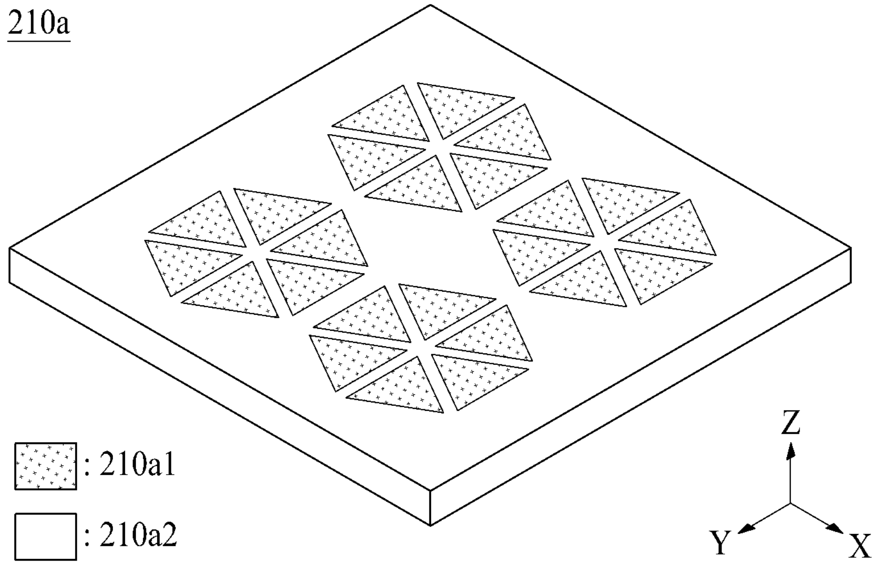

With reference to FIG. 5E, in a vibration device 210 according to another embodiment of the present disclosure, a vibration portion 210_a_ can include a plurality of first portions 210_a_1, which are apart from one another in a first direction X and a second direction Y, and a second portion 210_a_2 disposed between the plurality of first portions 210_a_1.

Each of the plurality of first portions 210_a_1 can have a triangular-shaped planar structure and can be in a group of eight first portions 210_a_1, where the group forms a hexagon, with spaces between the first portions 210_a_1 of the group. Two or more groups can be provided, with a second portion 210_a_2 forming the space between the first portions within each group, and forming a space between the groups. For example, each of the plurality of first portions 210_a_1 can have a triangular plate shape. Each of the plurality of first portions 210_a_1 can include substantially the same piezoelectric material as that of the first portion 210_a_1 described above with reference to FIGS. 3, 4, and 5A, and thus, like reference numerals refer to like elements and repeated descriptions thereof are omitted.

According to an embodiment of the present disclosure, six adjacent first portions 210_a_1 of the plurality of first portions 210_a_1 can be arranged adjacent to one another to form a hexagonal shape (e.g., a regular hexagonal shape). A vertex of each of the six adjacent first portions 210_a_1 forming a hexagonal shape can be disposed adjacent to a center portion (e.g., a middle portion) of a hexagonal shape.

The second portion 210_a_2 can be arranged between the plurality of first portions 210_a_1 in each of the first direction X and the second direction Y. The second portion 210_a_2 can be configured to surround each of the plurality of first portions 210_a_1, and thus, can be connected or adhered to a lateral surface of each of the plurality of first portions 210_a_1. Each of the plurality of first portions 210_a_1 and the second portion 210_a_2 can be disposed (e.g., arranged) in parallel on the same plane (e.g., the same layer). The second portion 210_a_2 can include substantially the same organic material as that of the second portion 210_a_2 described above with reference to FIGS. 3, 4, and 5A, and thus, like reference numerals refer to like elements and repeated descriptions thereof are omitted.

Figure 6:
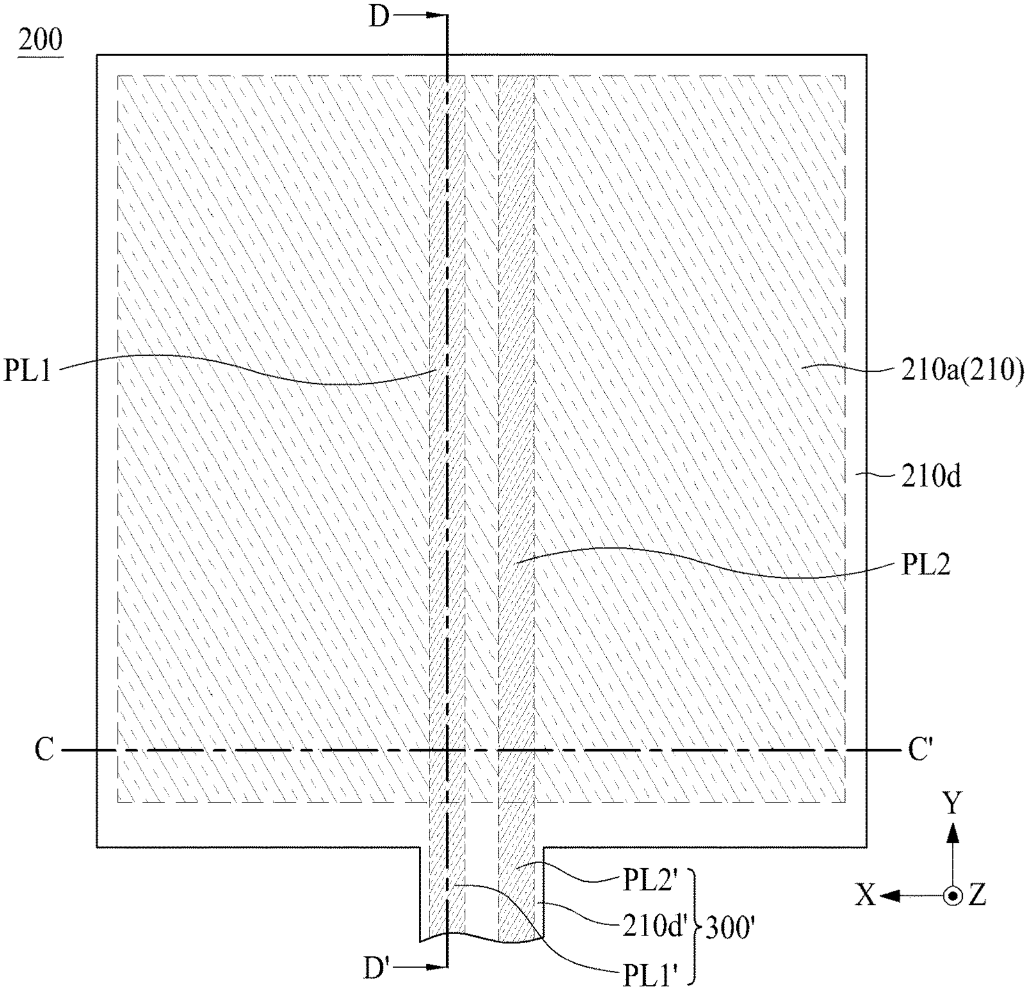
FIG. 6 illustrates a vibration apparatus according to an embodiment of the present disclosure.
Figure 7:
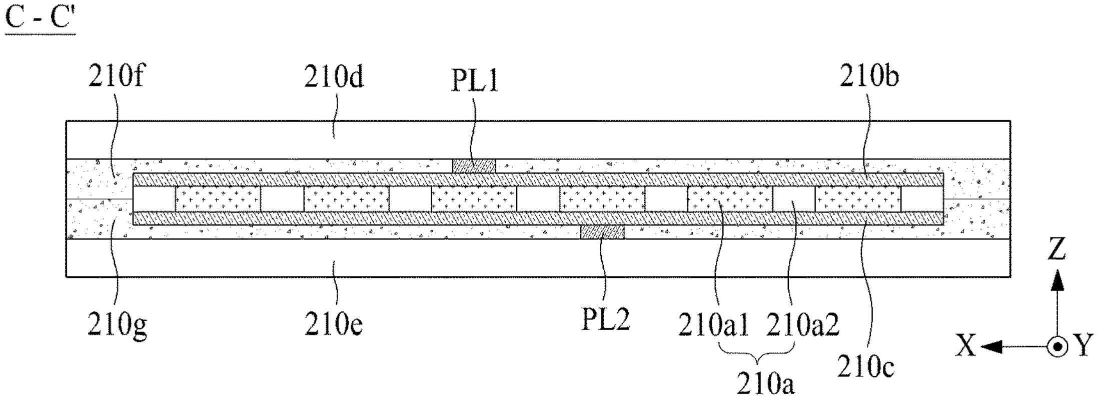
FIG. 7 is a cross-sectional view taken along line C-C' of FIG. 6.
Figure 8:
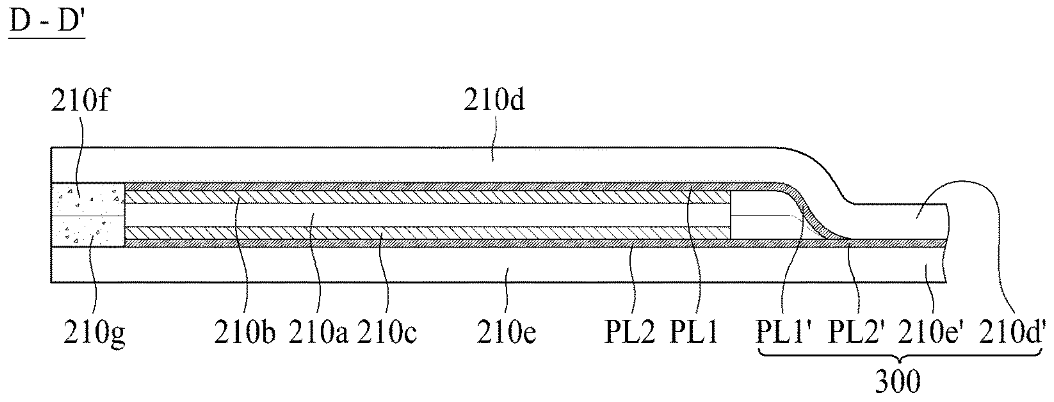
FIG. 8 is a cross-sectional view taken along line D-D' of FIG. 6.

FIG. 6 illustrates a vibration apparatus according to another embodiment of the present disclosure, FIG. 7 is a cross-sectional view taken along line C-C' of FIG. 6, and FIG. 8 is a cross-sectional view taken along line D-D' of FIG. 6. FIGS. 6 to 8 illustrate an embodiment implemented by modifying the vibration signal connection member of the vibration device illustrated in FIGS. 3 to 5E. Hereinafter, therefore, the other elements except a vibration signal connection member and relevant elements are referred to by like reference numerals, and repeated descriptions thereof are omitted or will be briefly given.

With reference to FIGS. 6 to 8, a vibration apparatus 200 according to another embodiment of the present disclosure can include a vibration generating portion and a vibration signal connection member 300'.

The vibration generating portion can include a vibration portion 210_a_, a first electrode portion 210_b_, and a second electrode portion 210_c_. The vibration generating portion can be substantially the same as the vibration generating portion of the vibration device 210 described above with reference to FIGS. 3 to 5E, and thus, like reference numerals refer to like elements and repeated descriptions thereof are omitted.

The vibration signal connection member 300' can be configured in a form where a first power supply line PL1 and a second power supply line PL2 extend along with some elements (for example, first and second cover members 210_d_ and 210_e_) of the vibration device 210. For example, the vibration signal connection member 300' can be electrically connected to the first and second electrode portions 210_b_ and 210_c_ at one side (e.g., a first side) of the vibration device 210, and thus, can be provided as one body with the vibration generating portion. For example, the vibration signal connection member 300' may not pass through the pad portion described above with reference to FIGS. 3 to 5E and can be electrically connected to the first and second electrode portions 210_b_ and 210_c_. For example, the vibration device 210 can avoid and not be in contact with the pad portion.

The vibration signal connection member 300' according to another embodiment of the present disclosure can include a first power supply extension line PL1' and a second power supply extension line PL2'. For example, the first power supply extension line PL1' can extend from the first power supply line PL1 disposed between the first electrode portion

210*b* and the first cover member 210*d* of the vibration portion 210*a*. The first power supply extension line PL1' can be a protrusion line which is provided as one body with the first power supply line PL1. The second power supply extension line PL2' can extend from the second power supply line PL2 disposed between the second electrode portion 210*c* and the second cover member 210*e* of the vibration portion 210*a*. The second power supply extension line PL2' can be a protrusion line which is provided as one body with the second power supply line PL2. For example, each of the first and second power supply extension lines PL1' and PL2' can be referred to as a protrusion electrode, an extension electrode, a finger line, or a finger electrode, or any other type of conducting or semiconducting device, but embodiments of the present disclosure are not limited thereto.

The vibration signal connection member 300' according to another embodiment of the present disclosure can include the first power supply extension line PL1', the second power supply extension line PL2', a first cover extension member 210*d*', and a second cover extension member 210*e*'. For example, the first cover extension member 210*d*' can cover the first power supply extension line PL1' or the second power supply extension line PL2', and the first cover extension member 210*d*' extends from the first cover member 210*d* of the vibration portion 210*a* and is exposed at the outside of the vibration portion 210*a*. The first cover extension member 210*d*' can be a protrusion film which is provided as one body with the first cover member 210*d*. The second cover extension member 210*e*' can cover the first power supply extension line PL1' or the second power supply extension line PL2', and the first cover extension member 201*e*' extends from the second cover member 210*e* of the vibration portion 210*a* and is exposed at the outside of the vibration portion 210*a*. The second cover extension member 210*e*' can be a protrusion film which is provided as one body with the second cover member 210*e*.

The vibration signal connection member 300' can further include a line layer between the first cover extension member 210*d*' and the second cover extension member 210*e*'. Each of the first power supply extension line PL1' and the second power supply extension line PL2' can be electrically connected to each of the first and second driving signal supply lines disposed in the line layer, or can extend or protrude in parallel with each of the first and second driving signal supply lines.

The vibration signal connection member 300' according to another embodiment of the present disclosure can extend in an integration structure from the vibration device 210 and can have a function of a signal cable, and moreover, can directly supply the vibration driving signal to each of the first and second electrode portions 210*b* and 210*c* through the first and second power supply extension line PL1' and PL2'. Accordingly, voltage drop caused by a surface resistance characteristic of each of the first and second electrode portions 210*b* and 210*c* can be reduced, an electrical characteristic of each of the first and second electrode portions 210*b* and 210*c* can be complemented, and the degree of selection freedom of a conductive material used in the first and second electrode portions 210*b* and 210*c* can increase.

The first cover extension member 210*d*' can extend from one side of the first cover member 210*d*. For example, the first cover extension member 210*d*' can be configured to cover the first power supply extension line PL1' extending from the vibration device 210. Accordingly, the first cover member 210*d* and the first cover extension member 210*d*' can protect the first electrode portion 210*b*, the first power supply line PL1, and the first power supply extension line PL1'.

The second cover extension member 210*d*' can extend from one side of the second cover member 210*e*. For example, the second cover extension member 210*e*' can be configured to cover the second power supply extension line PL2' extending from the vibration device 210. Accordingly, the second cover member 210*e* and the second cover extension member 210*e*' can protect the second electrode portion 210*c*, the second power supply line PL2, and the second power supply extension line PL2'.

Each of the first and second cover extension members 210*d*' and 210*e*' according to another embodiment of the present disclosure can include one or more material of plastic, ceramic, fiber, and wood, but embodiments of the present disclosure are not limited thereto. For example, the first and second cover extension members 210*d*' and 210*e*' can include the same material or different materials. For example, each of the first and second cover extension members 210*d*' and 210*e*' can include a material which is the same as or different from that of the first and second cover members 210*d* and 210*e*. For example, each of the first and second cover extension members 210*d*' and 210*e*' can be a film, such as a polyimide film or a polyethylene terephthalate film, but embodiments of the present disclosure are not limited thereto.

Each of the first and second cover extension members 210*d*' and 210*e*' according to another embodiment of the present disclosure can be electrically insulated from the first and second power supply extension lines PL1' and PL2' by using the first and second adhesive layers 210*f* and 210*g*, and thus, one or more of the first and second cover extension members 210*d*' and 210*e*' can include a metal film or a metal plate including a metal material. Each of the first and second cover extension members 210*d*' and 210*e*' including a metal material can reinforce a mass of the vibration device 210 or the vibration portion 210*a* to decrease a resonance frequency of a vibration structure based on an increase in mass, thereby increasing a sound characteristic and/or a sound pressure level characteristic of a low-pitched sound band generated based on a vibration of the vibration device 210 or the vibration portion 210*a*. For example, each of the first and second cover extension members 210*d*' and 210*e*' including a metal material can include one or more materials of stainless steel, aluminum (Al), a magnesium (Mg) alloy, a Mg—Li (lithium) alloy, a silver (Ag) alloy, a gold (Au) alloy, and an Al alloy, but embodiments of the present disclosure are not limited thereto.

Each of the first adhesive layer 210*f* and the second adhesive layer 210*g* according to an embodiment of the present disclosure can include an electrical insulation material which has adhesive properties and is capable of compression and decompression. For example, each of the first adhesive layer 210*f* and the second adhesive layer 210*g* can include epoxy resin (e.g., two part epoxy), acrylic resin, silicone resin, a ultraviolet light (UV) curable, and urethane resin, but embodiments of the present disclosure are not limited thereto.

As described above, in the vibration device 210 according to another embodiment of the present disclosure, a patterning process of forming a pad portion in the cover members 210*d*, 210*e*, 210*d*', and 210*e*' on the basis of an integration structure between the electrode portions 210*b* and 210*c* and the first and second power supply extension lines PL1' and PL2' of the vibration signal connection member 300' and a soldering process between the pad portion and a separate signal cable may not be needed, and thus, a structure and a manufacturing process can be simplified.

Figure 9:
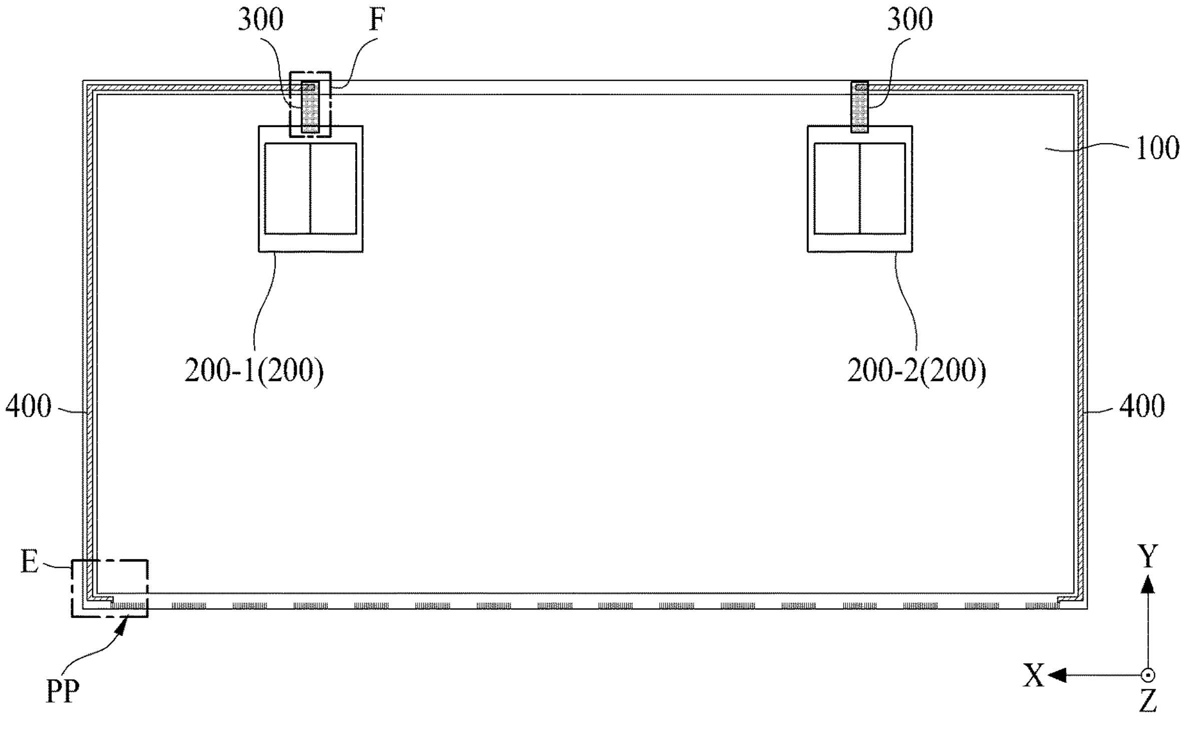
FIG. 9 illustrates an apparatus according to an embodiment of the present disclosure.
Figure 10:
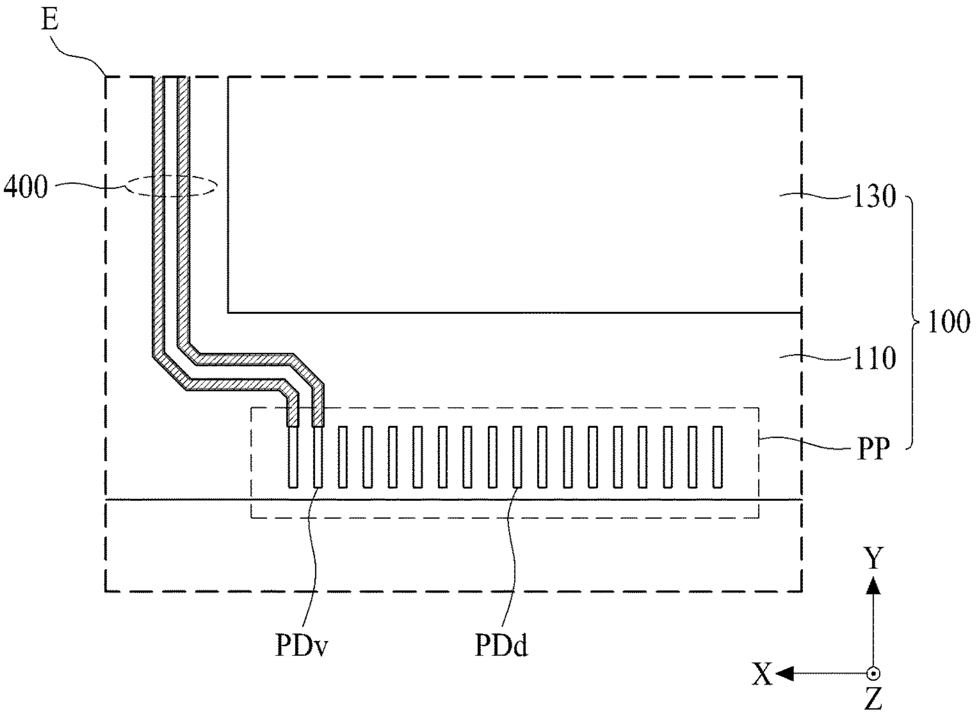
FIG. 10 illustrates a region E of FIG. 9.
Figure 11:
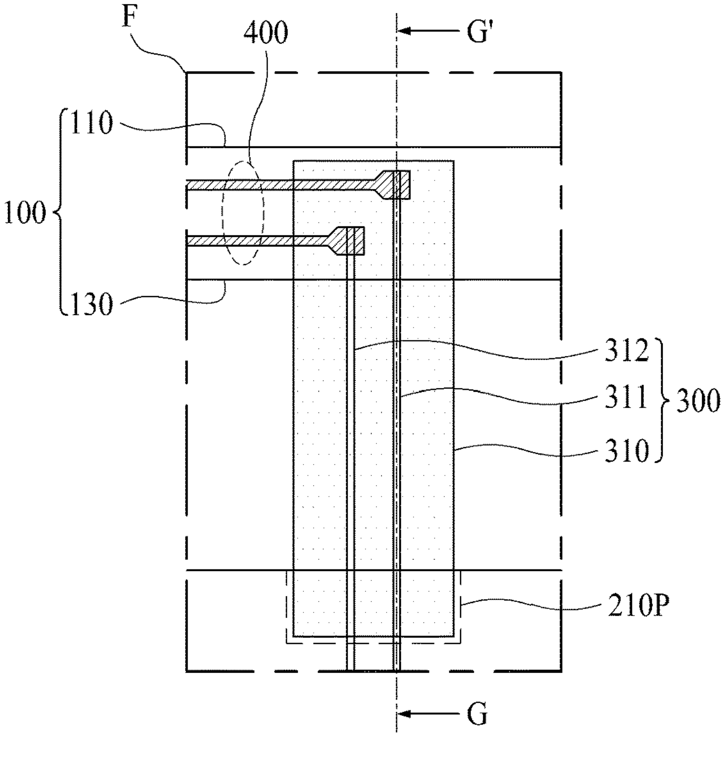
FIG. 11 illustrates a region F of FIG. 9.
Figure 12:
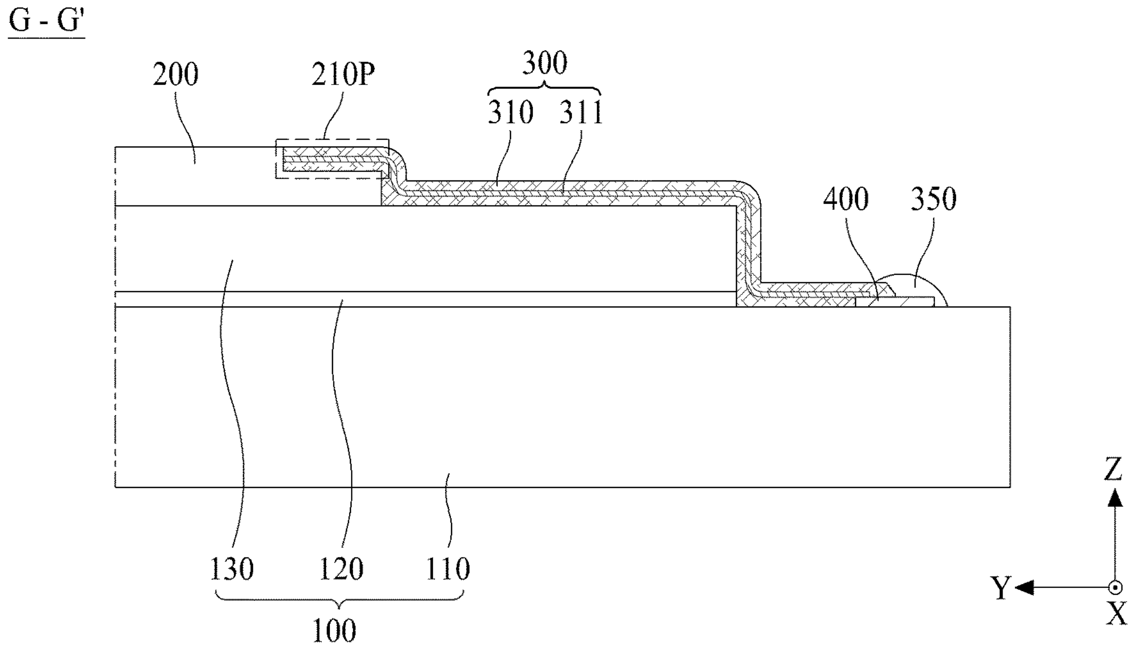
FIG. 12 is a cross-sectional view taken along line G-G' of FIG. 11.

FIG. 9 illustrates an apparatus according to an embodiment of the present disclosure, FIG. 10 illustrates a region E of FIG. 9, FIG. 11 illustrates a region F of FIG. 9, and FIG. 12 is a cross-sectional view taken along line G-G' of FIG. 11.

With reference to FIGS. 9 to 12, the apparatus according to an embodiment of the present disclosure can include a vibration apparatus 200, a pad portion PP, a vibration signal connection member 300, and a pad connection member 400, which are disposed on a rear surface of a display panel 100. The vibration apparatus 200 can be provided in plurality and spaced apart from one another in a first direction X.

The pad connection member 400 can be connected to the pad portion PP. The pad connection member 400 can be connected to the pad portion PP at one end (e.g., a first end) thereof, and the other end (e.g., a second end) thereof can be electrically connected to the vibration apparatus 200. That is, the pad connection member 400 can connect the pad portion PP to the vibration apparatus 200. The vibration apparatus 200 can be connected to the pad connection member 400 through the vibration signal connection member 300 and can be electrically connected to the pad portion PP. For example, the pad connection member 400 can electrically connect the pad portion PP to the vibration signal connection member 300, and thus, can transfer a vibration driving signal from the pad portion PP to the vibration signal connection member 300 to provide the vibration driving signal to the vibration apparatus 200.

The display panel 100 can include a first substrate 110, a pixel array portion 120 (see FIG. 12), a second substrate 130, the pad portion PP, and the pad connection member 400. The pixel array portion 120 can be disposed on the first substrate 110 and can be disposed overlapping the first substrate 110, including in the third direction Z. The first substrate 110 can be a display substrate, but the terms are not limited thereto. The second substrate 130 can be disposed on the pixel array portion 120 and can be disposed overlapping the pixel array portion 120, including in the third direction Z. The second substrate 130 can be a back plate or an encapsulation substrate, but the terms are not limited thereto.

The pad portion PP can be disposed in a non-display area IA of the first substrate 110. The pad portion PP can include a plurality of display signal pads PDd and a plurality of vibration signal pads PDv. The plurality of display signal pads PDd and a plurality of vibration signal pads PDv can be different from one another. For example, the plurality of display signal pads PDd can be arranged in parallel at an edge of the display panel 100 or can be arranged at a side surface of the display panel 100. For example, the plurality of vibration signal pads PDv can be arranged in parallel at the edge of the display panel 100 or can be arranged at a side surface of the display panel 100. For example, the plurality of display signal pads PDd and the plurality of vibration signal pads PDv may not be electrically connected to one another and can be disposed to be electrically disconnected from one another. For example, the plurality of display signal pads PDd and the plurality of vibration signal pads PDv can be arranged in parallel at the edge of the display panel 100 or any surface of the display panel in the non-display area IA.

The plurality of vibration signal pads PDv can be provided as a fewer number than the number of display signal pads PDd or as a greater number than the number of display signal pads PDd. For example, the plurality of display signal pads PDd can be mainly disposed in the pad portion PP, and the plurality of vibration signal pads PDv can be disposed at one edge (e.g., a first edge) or the other edge (e.g., a second edge) of the pad portion PP or can be disposed as some between the plurality of display signal pads PDd.

The pad portion PP can be provided in plurality which are respectively disposed at a plurality of positions apart from one another along the edge of the display panel 100.

The plurality of display signal pads PDd can be disposed in each of the plurality of pad portions PP. For example, the plurality of display signal pads PDd can be disposed in all of the plurality of pad portions PP, or can be disposed in all except at least some of the plurality of pad portions PP.

The plurality of vibration signal pads PDv can be disposed in only some of the plurality of pad portions PP. For example, the plurality of vibration signal pads PDv can be disposed in the pad portion PP disposed in an outer region of the display panel 100 or any region of the display panel 100. For example, the plurality of vibration signal pads PDv can be disposed in each of pad portions PP which are laterally and symmetrically arranged at a left end and a right end, with respect to a first direction X of the display panel 100. The plurality of vibration signal pads PDv can be disposed in pad portions PP which are laterally and symmetrically arranged at a center between a center and the left end and a center between the center and the right end, with respect to the first direction X of the display panel 100. The plurality of vibration signal pads PDv can be disposed in a pad portion disposed at the center, with respect to the first direction X of the display panel 100. As another example, the plurality of vibration signal pads PDv can be disposed in some of a plurality of pad portions PP arranged along the edge of the display panel 100. Further, the plurality of vibration signal pads PDv can be disposed in some of a plurality of pad portions PP arranged along any portion of the display panel 100.

With reference to FIG. 10, the pad connection member 400 according to an embodiment of the present disclosure can be connected to the plurality of vibration signal pads PDv and the pad connection member can extend along an entire outer edge of the display device 100 or from the pad portion PP to the vibration signal connection member 300, which can extend along two or more lateral sides of the display device 100. The pad connection member 400 can be connected to the plurality of vibration signal pads PDv at one end (e.g., a first end) thereof, and the other end (e.g., a second end) thereof can extend along the edge of the display panel 100. For example, the pad connection member 400 can be connected to the plurality of vibration signal pads PDv at one end (e.g., a first end) thereof, and the other end (e.g., a second end) thereof can extend along the non-display area IA of the display panel 100 and can be disposed therein. For example, the pad connection member 400 can be disposed on the first substrate 110 of the display panel 100. The pad portion PP can be disposed on the first substrate 110 of the display panel 100, the pad connection member 400 can be connected to the pad portion PP on the first substrate 110 at one end (e.g., a first end) thereof, and the other end (e.g., a second end) thereof can extend along the edge of the first substrate 110 and can be disposed on the first substrate 110. For example, the pad connection member 400 can be disposed not to overlap the second substrate 130 in the display panel 100. The pad connection member 400 can be disposed in a region which does not overlap the second substrate 130, on the first substrate 110 of the display panel 100.

According to an embodiment of the present disclosure, as illustrated in FIG. 10, the pad connection member 400 can be configured with a plurality of pad connection line patterns which are electrically and respectively connected to the plurality of vibration signal pads PDv. For example, the plurality of vibration signal pads PDv can receive a vibration driving signal supplied from the outside (e.g., via wireless communication, coax cable connection, ethernet, etc.). The vibration driving signal can be supplied to the vibration apparatus 200 through the vibration signal pad PDv. The pad connection member 400 can be connected to the vibration signal pad PDv and can transfer the vibration driving signal to the vibration apparatus 200. The pad connection member 400 may not be directly connected to the vibration apparatus 200. The pad connection member 400 can be connected to the vibration signal pad PDv at one end (e.g., a first end) thereof, and the other end (e.g., a second end) thereof can be disposed to extend up to a region adjacent to the vibration apparatus 200.

With reference again to FIG. 9, the pad connection member 400 according to an embodiment of the present disclosure can be connected to the pad portion PP, disposed near left and right corners of a lower end of the display panel 100, at one end (e.g., a first end) thereof. The pad connection member 400 can be connected to the pad portion PP, disposed near left and right corners of a lower end of the first substrate 110, at the one end (e.g., a first end) thereof. The pad connection member 400 can be connected to the vibration signal pad PDv of the pad portion PP at the one end (e.g., a first end) thereof. For example, the pad connection member 400 can be connected to the pad portion PP at the one end (e.g., a first end) thereof, and the other end (e.g., a second end) thereof can extend along the edge of the display panel 100 from the left and right corners of the lower end of the display panel 100 and can be disposed adjacent to vibration apparatuses 200-1 and 200-2 disposed on a rear surface (e.g., a backside surface) of the display panel 100. The pad connection member 400 can be connected to the pad portion PP at the one end (e.g., a first end) thereof, and the other end (e.g., a second end) thereof can extend along the edge of the display panel 100 from the left and right corners of the lower end of the first substrate 110 of the display panel 100 and can be disposed adjacent to the vibration apparatuses 200-1 and 200-2 disposed on the rear surface (e.g., the backside surface) of the display panel 100.

As illustrated in FIG. 9, the vibration apparatuses 200-1 and 200-2 can be disposed at an upper end with respect to a second direction Y (e.g., a lengthwise direction) of the display panel 100. The vibration apparatuses 200-1 and 200-2 can be laterally and symmetrically arranged with a center of the upper end of the display panel 100 therebetween, with respect to the first direction X of the display panel 100. The vibration apparatuses 200-1 and 200-2 can be disposed on the second substrate 130 of the display panel 100. The pad connection member 400 can extend along the edge of the display panel 100 from pad portions PP disposed at left and right sides of a lower edge of the display panel 100, and thus, the other end (e.g., a second end) of the pad connection member 400 can be disposed at an upper edge of the display panel 100 adjacent to the vibration apparatuses 200-1 and 200-2. For example, in FIG. 9, it is illustrated that the pad connection member 400 extending from the left side of the lower end of the display panel 100 is disconnected from the pad connection member 400 extending from the right side of the lower end of the display panel 100, but embodiments of the present disclosure are not limited thereto and the pad connection member 400 can extend along the edge of the display panel 100 from the pad portion PP of the left side of the lower end of the display panel 100 and can be disposed to be connected to the pad portion PP of the right side of the lower end of the display panel 100 in a loop form.

With reference to FIGS. 11 and 12, vibration apparatuses 200-1 and 200-2 according to an embodiment of the present disclosure can be connected to a pad connection member 400 through a vibration signal connection member 300. The vibration apparatuses 200-1 and 200-2 can be disposed directly on the second substrate 130, the second substrate can be directly disposed on the pixel array portion 120, and the pixel array portion 120 can be directly disposed on the first substrate 110. The pad connection member can be disposed directly on the first substrate 110. The first substrate 110 can extend further in the second direction Y than the pixel array portion 120, and the pixel array portion 120 and the second substrate can extend further in the second direction Y than the vibration apparatuses 200-1 and 200-2. For example, the vibration signal connection member 300 can be connected to a pad portion 210*p* of each of the vibration apparatuses 200-1 and 200-2. The vibration signal connection member 300 can be connected to the pad connection member 400. The vibration apparatuses 200-1 and 200-2 can be electrically connected to the pad connection member 400, which is connected to a pad portion PP and extends, through the vibration signal connection member 300. The vibration apparatuses 200-1 and 200-2 can receive a vibration driving signal, applied through the pad portion PP, through the pad connection member 400 and the vibration signal connection member 300. For example, the pad portion PP can be supplied with the vibration driving signal from the sound processing circuit, the pad portion PP can be connected to the pad connection member 400, the vibration signal connection member 300 can be connected to the pad connection member 400, and the vibration signal connection member 300 can be connected to the vibration apparatuses 200-1 and 200-2, and thus, the vibration apparatuses 200-1 and 200-2 can be electrically connected to the pad portion PP and can receive the vibration driving signal provided from the sound processing circuit.

The vibration signal connection member 300 can be connected to the pad portion 210*p* of each of the vibration apparatuses 200-1 and 200-2 at one end (e.g., a first end) thereof, and the other end (e.g., a second end) thereof can be connected to the pad connection member 400. The vibration signal connection member 300 can be disposed on a second substrate 130 of the display panel 100. The vibration signal connection member 300 can be disposed on a first substrate 110 of the display panel 100. For example, the vibration signal connection member 300 can extend up to the pad connection member 400, disposed on the first substrate 110 of the display panel 100, from the vibration apparatuses 200-1 and 200-2 disposed on the second substrate 130 of the display panel 100. The vibration signal connection member 300 according to an embodiment can include a first terminal, electrically connected to a first pad electrode of the pad portion 210*p* of each of the vibration apparatuses 200-1 and 200-2, and a second terminal electrically connected to a second pad electrode of the pad portion 210*p*.

The vibration signal connection member 300 according to an embodiment of the present disclosure can be implemented as a film type (for example, chip on film (COF)) where a signal line is provided therein and can be bonded (e.g., coupled) and electrically connected to the pad portion 210*p* by using a tape automated bonding (TAB) type. For example, the vibration signal connection member 300 can include a line layer, a lower film which is coupled to a first surface of the line layer by using an adhesive, an upper film which is coupled to a second surface of the line layer by using an adhesive, and a plurality of contact pads and first and second terminals disposed on the upper film and connected to the line layer.

The line layer can include a base film, a plurality of signal lines formed on one or more of a front surface and a bottom surface (e.g., a lower surface) of the base film, and first and second driving signal supply lines formed on one or more of a front surface and a bottom surface (e.g., a lower surface) of the base film. For example, the plurality of signal lines and the first and second driving signal supply lines can include a conductive material including Cu, Al, Ag, or an alloy material of Cu and Ag, but embodiments of the present disclosure are not limited thereto.

Each of the plurality of contact pads can be disposed on one of the lower film and the upper film and can be selectively connected to the plurality of signal lines and the first and second driving signal supply lines through a via hole. The first and second terminals can be electrically connected to the first and second pad electrodes of the pad portion 210*p* provided in the vibration device 210, respectively.

The vibration signal connection member 300' according to another embodiment of the present disclosure can be configured in a form where a first power supply line PL1 and a second power supply line PL2 extend along with some elements (for example, first and second cover members 210*d* and 210*e*) of the vibration device 210. For example, the vibration signal connection member 300' can be electrically connected to the first and second electrode portions 210*b* and 210*c* at one side of the vibration device 210, and thus, can be provided as one body with the vibration generating portion. For example, the vibration signal connection member 300' may not pass through the pad portion described above with reference to FIGS. 3 to 5E and can be electrically connected to the first and second electrode portions 210*b* and 210*c*.

The vibration signal connection member 300' can include a first power supply extension line PL1' and a second power supply extension line PL2'. For example, the first power supply extension line PL1' can extend from the first power supply line PL1 disposed between the first electrode portion 210*b* and the first cover member 210*d* of the vibration portion 210*a*. The first power supply extension line PL1' can be a protrusion line which is provided as one body with the first power supply line PL1. The second power supply extension line PL2' can extend from the second power supply line PL2 disposed between the second electrode portion 210*c* and the second cover member 210*e* of the vibration portion 210*a*. The second power supply extension line PL2' can be a protrusion line which is provided as one body with the second power supply line PL2. For example, each of the first and second power supply extension lines PL1' and PL2' can be referred to as a protrusion electrode, an extension electrode, a finger line, or a finger electrode, but embodiments of the present disclosure are not limited thereto.

The vibration signal connection member 300' can include the first power supply extension line PL1', the second power supply extension line PL2', a first cover extension member 210*d'*, and a second cover extension member 210*e'*. For example, the first cover extension member 210*d'* can cover the first power supply extension line PL1' or the second power supply extension line PL2', and the first cover extension member 210*d'* extends from the first cover member 210*d* of the vibration portion 210*a* and is exposed at the outside of the vibration portion 210*a*. The first cover extension member 210*d'* can be a protrusion film which is provided as one body with the first cover member 210*d*. The second cover extension member 210*e'* can cover the first power supply extension line PL1' or the second power supply extension line PL2', and the second extension member 210*e'* extends from the second cover member 210*e* of the vibration portion 210*a* and is exposed at the outside of the vibration portion 210*a*. The second cover extension member 210*e'* can be a protrusion film which is provided as one body with the second cover member 210*e*.

The vibration signal connection member 300' can further include a line layer between the first cover extension member 210*d'* and the second cover extension member 210*e'*. Each of the first power supply extension line PL1' and the second power supply extension line PL2' can be electrically connected to each of the first and second driving signal supply lines disposed in the line layer, or can extend or protrude in parallel with each of the first and second driving signal supply lines.

The vibration signal connection member 300' can extend in an integration structure from the vibration device 210*a* and can have a function of a signal cable, and moreover, can directly supply the vibration driving signal to each of the first and second electrode portions 210*b* and 210*c* through the first and second power supply extension line PL1' and PL2'. Accordingly, voltage drop caused by a surface resistance characteristic of each of the first and second electrode portions 210*b* and 210*c* can be reduced, an electrical characteristic of each of the first and second electrode portions 210*b* and 210*c* can be complemented, and the degree of selection freedom of a conductive material used in the first and second electrode portions 210*b* and 210*c* can increase.

In another embodiment of the present disclosure, the vibration signal connection member 300 can be a kind of signal cable and can be configured as a flexible printed circuit cable, a flexible flat cable, a single-sided flexible printed circuit, a single-sided flexible PCB, a flexible multi-layer printed circuit, or a flexible multi-layer PCB, but embodiments of the present disclosure are not limited thereto.

With reference again to FIGS. 11 and 12, the vibration signal connection member 300 according to an embodiment of the present disclosure can include a first signal line 311 connected to the first power supply line PL1 of the vibration portion 210*a*, a second signal line 312 connected to the second power supply line PL2 of the vibration portion 210*a*, and a body portion 310 surrounding the first and second signal lines 311 and 312. The body portion 310 can be formed as a film type where the first and second signal lines 311 and 312 are provided therein. For example, the body portion 310 can be a polyimide film or a polyethylene terephthalate film. Alternatively, the body portion 310 can be configured as a flexible printed circuit cable, a flexible flat cable, a single-sided flexible printed circuit, a single-sided flexible PCB, a flexible multi-layer printed circuit, or a flexible multi-layer PCB, but embodiments of the present disclosure are not limited thereto. As another example, the vibration signal connection member 300 can be configured as the first power supply extension line PL1' extending from the first power supply line PL1 of the vibration portion 210*a*, the second power supply extension line PL2' extending from the second power supply line PL2 of the vibration portion 210*a*, and the first and second cover extension members 210*d'* and 210*e'* extending from the first and second cover members 210*d* and 210*e* are replaced with the first and second signal lines 311 and 312 and the body portion 310.

For example, the vibration signal connection member 300 can be bonded (e.g., adhered) and coupled to the pad portion 210*p* of the vibration apparatus 200 where one end (e.g., a first end) thereof is disposed on the second substrate 130. The vibration signal connection member 300 can be disposed to extend in a direction, in which the pad connection member 400 is arranged, on the second substrate 130, cover a lateral surface of the second substrate 130, and extend and overlap up to the pad connection member 400 on the first substrate 110. The vibration signal connection member 300 can be bonded (e.g., adhered) and coupled to the pad connection member 400. A resin 350 can be disposed at a contact portion between the vibration signal connection member 300 and the pad connection member 400.

According to an embodiment of the present disclosure, the vibration apparatus 200 of the apparatus 10 can be electrically connected to the pad portion PP, disposed in the display panel 100, through the signal connection member 300 and the pad connection member 400. Because the vibration apparatus 200 of the apparatus can be supplied with the vibration driving signal (e.g., the sound signal) from the sound processing circuit through the signal connection member 300 disposed in the display panel 100, a hole exposing a line may not separately be provided in the back plate and a bridge PCB for connecting lines may not separately be provided, and thus, a process can be simplified, the assembly of a display apparatus can be enhanced, the degree of freedom in design of an apparatus can be enhanced, and the manufacturing cost of an apparatus can be reduced because the number of parts decreases and a process is simplified based on simplification.

Figure 13:
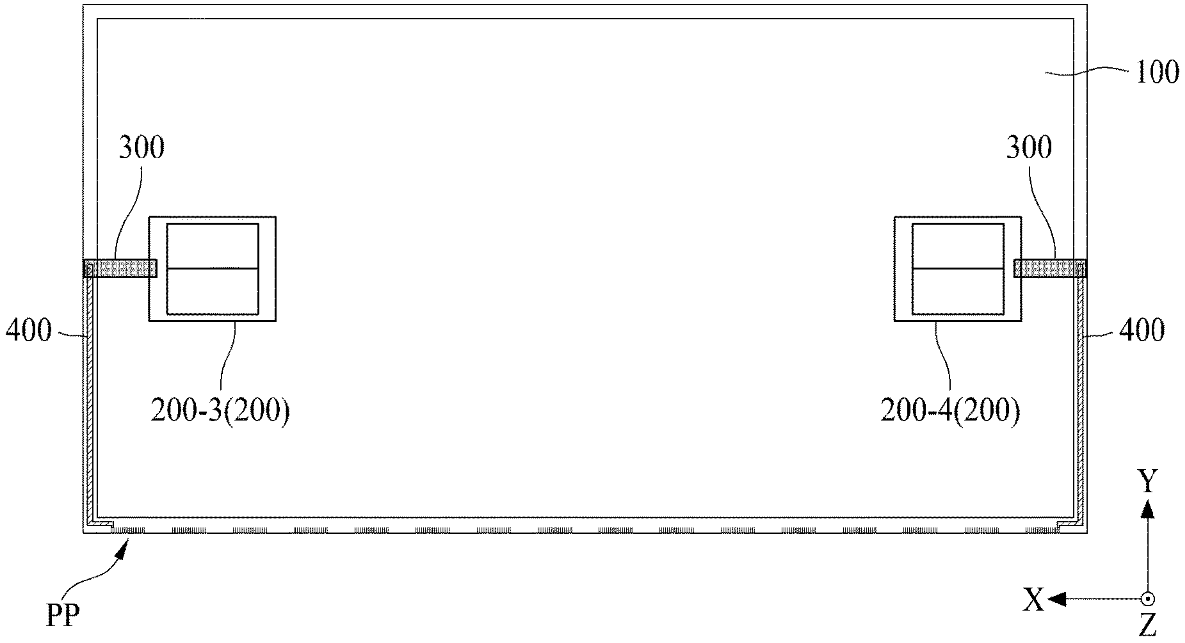
FIG. 13 illustrates an apparatus according to an embodiment of the present disclosure.
Figure 14:
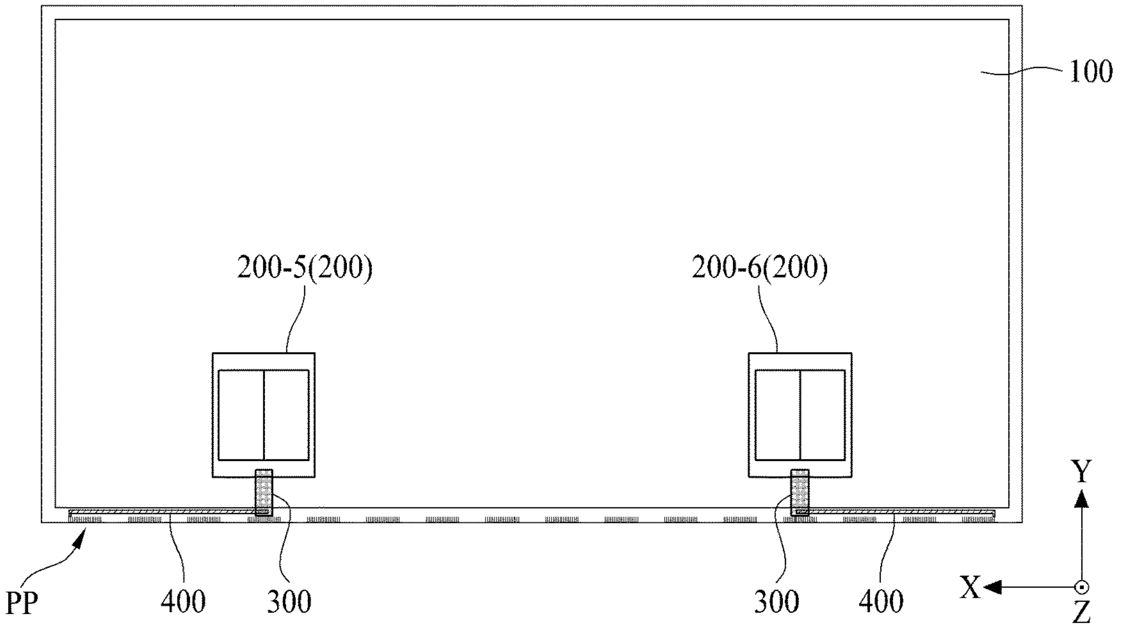
FIG. 14 illustrates an apparatus according to an embodiment of the present disclosure.
Figure 15:
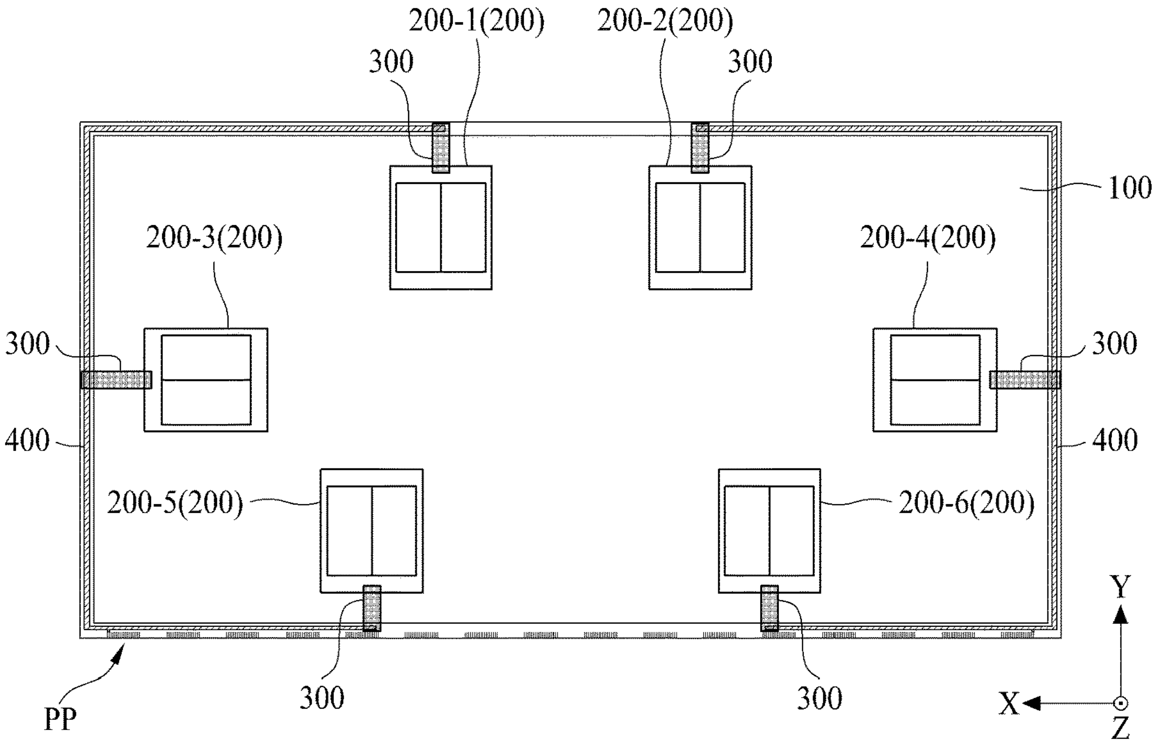
FIG. 15 illustrates an apparatus according to an embodiment of the present disclosure.

FIG. 13 illustrates an apparatus according to another embodiment of the present disclosure, FIG. 14 illustrates an apparatus according to another embodiment of the present disclosure, and FIG. 15 illustrates an apparatus according to another embodiment of the present disclosure. FIGS. 13 to 15 illustrate embodiments implemented by modifying the arrangement of the vibration apparatus in the apparatus illustrated in FIG. 9. Hereinafter, therefore, the other elements except elements associated with the arrangement of a vibration apparatus are referred to by like reference numerals, and repeated descriptions thereof are omitted or will be briefly given.

With reference to FIG. 13, vibration apparatuses 200-3 and 200-4 of an apparatus according to another embodiment of the present disclosure can be disposed at a middle end with respect to a second direction Y (e.g., a lengthwise direction) of a display panel 100. The vibration apparatuses 200-3 and 200-4 can be arranged to be laterally symmetric with a center of the middle end of the display panel 100, with respect to a first direction X of the display panel 100. The vibration apparatuses 200-3 and 200-4 can be disposed on a second substrate 130 of the display panel 100. A pad connection member 400 can extend along an edge of the display panel 100 from a pad portion PP disposed at left and right sides of a lower edge of the display panel 100, and the other end (e.g., a second end) of the pad connection member 400 can be disposed at an edge of a middle end of the display panel 100 adjacent to the vibration apparatuses 200-3 and 200-4. The vibration apparatuses 200-3 and 200-4 can be connected to the pad connection member 400 disposed at the edge of the middle end of the display panel 100 through a vibration signal connection member 300. For example, in FIG. 13, it is illustrated that a pad connection member 400 extending from a left side of a lower end of the display panel 100 is disconnected from a pad connection member 400 extending from a right side of the lower end of the display panel 100, but embodiments of the present disclosure are not limited thereto and the pad connection member 400 can extend along the edge of the display panel 100 from the pad portion PP of the left side of the lower end of the display panel 100 and can be disposed to be connected to the pad portion PP of the right side of the lower end of the display panel 100 in a loop form.

With reference to FIG. 14, vibration apparatuses 200-5 and 200-6 of an apparatus according to another embodiment of the present disclosure can be disposed at a lower end with respect to a second direction Y (e.g., a lengthwise direction) of a display panel 100. The vibration apparatuses 200-5 and 200-6 can be arranged to be laterally symmetric with a center of the lower end of the display panel 100, with respect to a first direction X of the display panel 100. The vibration apparatuses 200-5 and 200-6 can be disposed on a second substrate 130 of the display panel 100. A pad connection member 400 can extend in a direction toward a center of the display panel 100 from a pad portion PP disposed at left and right sides of a lower edge of the display panel 100, and the other end (e.g., a second end) of the pad connection member 400 can be disposed at an edge of a lower end of the display panel 100 adjacent to the vibration apparatuses 200-5 and 200-6. The vibration apparatuses 200-5 and 200-6 can be connected to the pad connection member 400 disposed at the edge of the lower end of the display panel 100 through a vibration signal connection member 300. For example, in FIG. 14, it is illustrated that a pad connection member 400 extending from a left side of a lower end of the display panel 100 is disconnected from a pad connection member 400 extending from a right side of the lower end of the display panel 100, but embodiments of the present disclosure are not limited thereto and the pad connection member 400 can be disposed to be rectilinearly connected up to the right side of the lower end of the display panel 100 from the pad portion PP at the left side of the lower end of the display panel 100.

With reference to FIG. 15, vibration apparatuses 200-1 to 200-6 of an apparatus according to another embodiment of the present disclosure can be disposed at an upper end, a middle end, and a lower end with respect to a second direction Y (e.g., a lengthwise direction) of a display panel 100. The vibration apparatuses 200-1 to 200-6 can be arranged to be laterally symmetric with a center of the display panel 100, with respect to a first direction X of the display panel 100. The vibration apparatuses 200-1 to 200-6 can be radially arranged with respect to a vertical and horizontal center of the display panel 100. The vibration apparatuses 200-1 to 200-6 can be disposed on a second substrate 130 of the display panel 100 and can be equally spaced in the first direction X and the second direction Y such that they are symmetrically disposed on the second substrate 130 and are disposed in a single plane. Alternatively, the vibration apparatuses 200-1 to 200-6 can have unequal spacing such that they are not symmetrically disposed on the second substrate 130. A pad connection member 400 can extend adjacent to the vibration apparatuses 200-3 and 200-4 along left and right edges of the display panel 100 from a pad portion PP disposed at a left side of a lower edge of the display panel 100. The other end (e.g., a second end) of the pad connection member 400 can be disposed at an upper edge of the display panel 100 adjacent to the vibration apparatuses 200-1 and 200-2. Also, the pad connection member 400 can extend in a direction toward a center of the display panel 100 from the pad portion PP disposed at left and right sides of the lower edge of the display panel 100, and the other end (e.g., a second end) of the pad connection member 400 can be disposed at an edge of the lower end of the display panel 100 adjacent to the vibration apparatuses 200-1 and 200-2. Each of the vibration apparatuses 200-1 to 200-6 can be connected to the pad connection member 400 through a vibration signal connection member 300. For example, in FIG. 15, it is illustrated that a pad connection member 400 extending from a left side of a lower end of the display panel 100 is disconnected from a pad connection member 400 extending from a right side of the lower end of the display panel 100, but embodiments of the present disclosure are not limited thereto and the pad connection member 400 can be disposed to be connected in a closed loop form which travels around a whole edge of the display panel 100 from the pad portion PP at left and right sides of the display panel 100. Also, it has been described that the pad portion PP is disposed at left and right edges of the lower end of the display panel 100, but embodiments of the present disclosure are not limited thereto and the pad portion PP can be disposed at an edge of a lower center of the display panel 100 and the pad connection member 400 can extend in a left or right direction from an edge of a lower center thereof, can travel around an edge of the display panel 100, and can be disposed to be connected in a closed loop form up to the edge of the lower center of the display panel 100 again.

Figure 16:
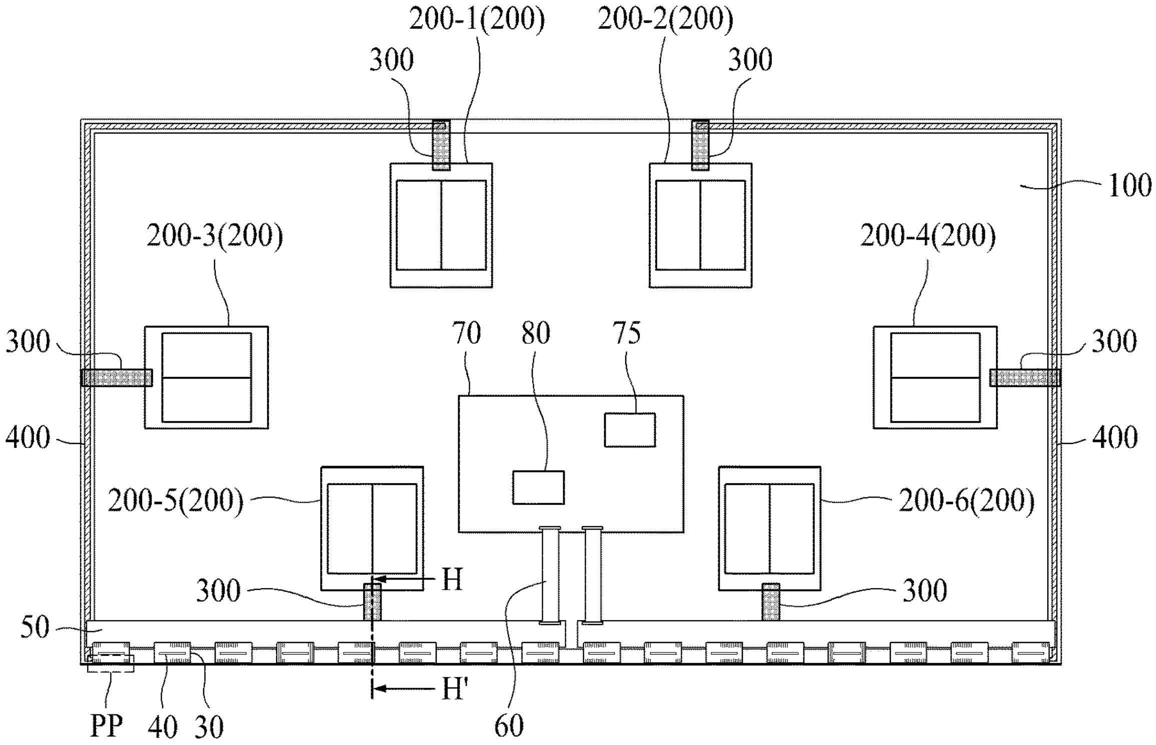
FIG. 16 illustrates an apparatus according to an embodiment of the present disclosure.
Figure 17:
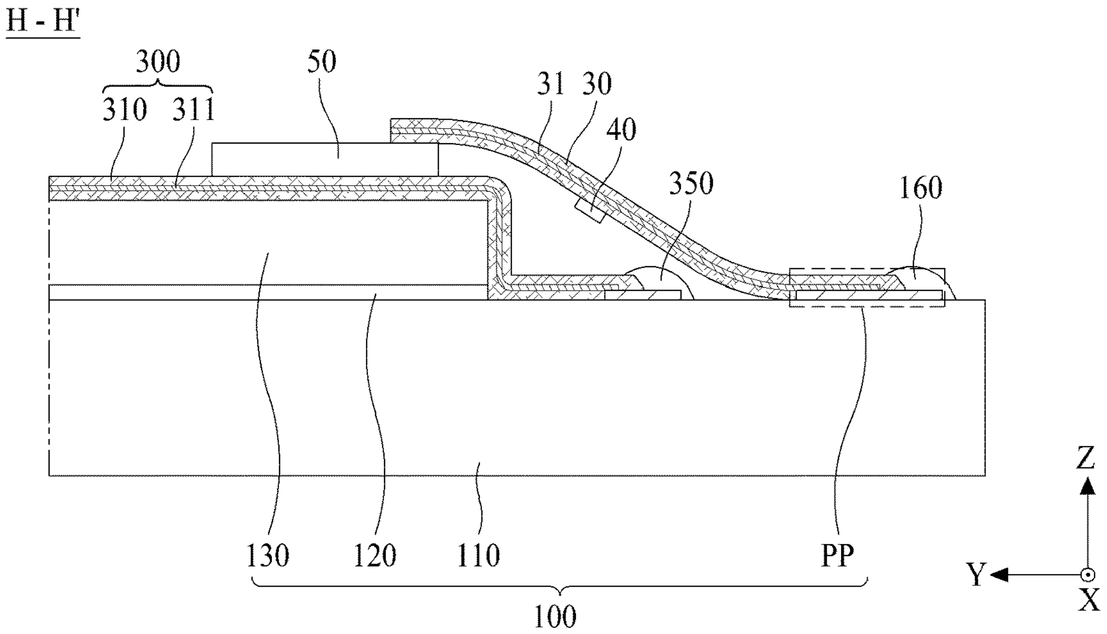
FIG. 17 is a cross-sectional view taken along line H-H' of FIG. 16.

FIG. 16 illustrates an apparatus according to another embodiment of the present disclosure, and FIG. 17 is a cross-sectional view taken along line H-H' of FIG. 16. FIGS. 16 and 17 illustrate an embodiment where a source PCB 50 and a control board 70 are added to the apparatus illustrated in FIG. 15. Hereinafter, therefore, the other elements except the source PCB 50, the control board 70, and relevant elements are referred to by like reference numerals, and repeated descriptions thereof are omitted or will be briefly given.

With reference to FIGS. 16 and 17, the apparatus according to another embodiment of the present disclosure can include vibration apparatuses 200-1 to 200-6, a pad portion PP, a vibration signal connection member 300, a pad connection member 400, a source PCB 50, and a control board 70, which are arranged on a rear surface of a display panel 100, The source PCB 50 can be coupled to the pad portion PP through a flexible film 30. A drive IC 40 can be disposed on the flexible film 30. For example, the flexible film 30 can be connected to the pad portion PP. The source PCB 50 can be disposed at one side of the display panel 100. For example, the source PCB 50 can be connected to the flexible film 30.

A cable 60 can be connected (e.g., electrically connected or electrically and mechanically connected) to the source PCB 50. Further, the cable 60 can be provided in plurality. A signal transfer line 31 can be disposed in the flexible film 30. For example, the flexible film 30 can include the signal transfer line 31 connected to the pad portion PP. For example, the pad connection member 400 can be connected to the signal transfer line 31 through the pad portion PP or by the pad portion PP. The signal transfer line 31 can be connected to the source PCB 50. The source PCB 50 can be connected to the cable 60. For example, the pad connection member 400 can be connected to the cable 60 by the pad portion PP and the source PCB 50. Also, a resin 160 can be disposed at one side of the flexible film 30.

The control board 70 can be disposed on a rear surface of the display panel 100. The control board 70 can include a timing controller 75 and a sound processing circuit 80, but is not limited thereto. For example, the sound processing circuit 80 can be embedded into the control board 70. A vibration driving signal (e.g., a sound signal) provided from the sound processing circuit 80 can be supplied to the vibration apparatus 200. For example, the vibration driving signal provided from the sound processing circuit 80 can be transferred to the source PCB 50 by the cable 60, and the vibration driving signal transferred to the source PCB 50 can be transferred to the pad connection member 400 through the pad portion PP and the signal transfer line 31 of the flexible film 30. The pad connection member 400 can be connected to the vibration signal connection member 300 of the vibration apparatus 200. Accordingly, the vibration driving signal can be applied to the vibration apparatus 200. For example, the vibration driving signal provided from the sound processing circuit 80 can be connected to the pad connection member 400 by the cable 60 through the pad portion PP and the signal transfer line 31 of the flexible film 30 and the source PCB 50, and the vibration signal connection member 300 can be connected to the pad connection member 400. Therefore, the vibration driving signal can be applied to the vibration apparatus 200.

The vibration apparatus according to an embodiment of the present disclosure can be applied to a vibration apparatus provided in the apparatus. The apparatus according to an embodiment of the present disclosure can be applied to mobile devices, video phones, smart watches, watch phones, wearable devices, foldable devices, rollable devices, bendable devices, flexible devices, curved devices, portable multimedia players (PMPs), personal digital assistants (PDAs), electronic organizers, desktop personal computers (PCs), laptop PCs, netbook computers, workstations, navigation devices, automotive navigation devices, automotive display apparatuses, televisions (TVs), wall paper display apparatuses, signage devices, game machines, notebook computers, monitors, cameras, camcorders, home appliances, etc. Also, the vibration apparatus according to an embodiment of the present disclosure can be applied to organic light emitting lighting devices or inorganic light emitting lighting devices. In a case where the vibration apparatus is applied to a lighting device, the vibration apparatus can act as lighting and a speaker. Also, in a case where the vibration apparatus according to an embodiment of the present disclosure is applied to a mobile device, the vibration apparatus can be one or more of a speaker, a receiver, or a haptic device, but embodiments of the present disclosure are not limited thereto.

An apparatus according to an embodiment of the present disclosure will be described below.

An apparatus according to an embodiment of the present disclosure comprises a vibration member including a pad portion, a vibration apparatus vibrating the vibration member, a pad connection member connected to the pad portion, and a vibration signal connection member connecting the vibration apparatus to the pad connection member.

According to some embodiments of the present disclosure, the vibration apparatus can be electrically connected to the pad portion through the pad connection member.

According to some embodiments of the present disclosure, the vibration apparatus can be electrically connected to the pad portion through the vibration signal connection member and the pad connection member.

According to some embodiments of the present disclosure, the vibration apparatus can does not directly contact the pad connection member.

According to some embodiments of the present disclosure, the vibration apparatus can be electrically connected to the pad connection member through the vibration signal connection member.

According to some embodiments of the present disclosure, the vibration member can include a first vibration member where the pad portion is provided, and a second vibration member where the vibration apparatus is provided, the second vibration member being on the first vibration member.

According to some embodiments of the present disclosure, the pad connection member can be on the first vibration member.

According to some embodiments of the present disclosure, the vibration signal connection member can be on the second vibration member.

According to some embodiments of the present disclosure, the vibration signal connection member can be on the first vibration member and the second vibration member.

According to some embodiments of the present disclosure, the vibration apparatus can include a vibration portion, a first electrode portion on a first surface of the vibration portion, and a second electrode portion on a second surface of the vibration portion.

According to some embodiments of the present disclosure, the vibration signal connection member can be electrically connected to each of the first electrode portion and the second electrode portion.

According to some embodiments of the present disclosure, the vibration apparatus can include a first cover member covering the first electrode portion, a second cover member covering the second electrode portion, a first power supply line disposed between the first electrode portion and the first cover member and electrically connected to the first electrode portion, and a second power supply line disposed between the second electrode portion and the second cover member and electrically connected to the second electrode portion, and the vibration signal connection member can be electrically connected to each of the first power supply line and the second power supply line.

According to some embodiments of the present disclosure, the vibration signal connection member can be formed through extension of the first and second power supply lines and the first and second cover members.

According to some embodiments of the present disclosure, the vibration member can include one or more materials of metal, plastic, fiber, leather, wood, cloth, paper, and glass.

According to some embodiments of the present disclosure, the vibration member can include one of a display panel including pixels displaying an image, a lighting panel, a signage panel, and a mirror.

According to some embodiments of the present disclosure, the vibration member can include a display panel including pixels displaying an image, or comprises one of an interior material of a vehicle, a window of a vehicle, a ceiling of a building, an interior material of a building, a window of a building, an interior of an aircraft, and a window of an aircraft.

According to some embodiments of the present disclosure, the vibration apparatus can include two or more vibration devices.

According to another embodiment of the present disclosure, an apparatus comprises a display panel displaying an image and including a pad portion, a vibration apparatus vibrating the display panel, a pad connection member connected to the pad portion, and a vibration signal connection member between the vibration apparatus and the pad connection member.

According to some embodiments of the present disclosure, the display panel can include a first substrate, a pixel array portion on the first substrate, and a second substrate on the pixel array portion.

According to some embodiments of the present disclosure, the pad portion can be on the first substrate, and the pad connection member can be connected to the pad portion, on the first substrate.

According to some embodiments of the present disclosure, the vibration apparatus can be on the second substrate, and the vibration signal connection member can be connected to the vibration apparatus, on the second substrate.

According to some embodiments of the present disclosure, the vibration signal connection member can be on the first substrate and the second substrate.

According to some embodiments of the present disclosure, the apparatus can further include a flexible film connected to the pad portion, a source printed circuit board (PCB) connected to the flexible film and disposed at one side of the display panel, and a cable connected to the source PCB, the pad connection member can be connected to the cable by the pad portion and the source PCB.

According to some embodiments of the present disclosure, the flexible film can include a signal transfer line connected to the pad portion, and the pad connection member can be connected to the signal transfer line by the pad portion.

According to some embodiments of the present disclosure, the vibration apparatus can be electrically connected to the pad connection member through the vibration signal connection member.

According to some embodiments of the present disclosure, the display panel can include a display area displaying the image and a non-display area surrounding the display area, the pad connection member can be in the non-display area, and the vibrations signal connection member can overlap at least a portion of the display area.

The apparatus according to an embodiment of the present disclosure can include a vibration apparatus which vibrates a display panel or a vibration member, and thus, a structure of a signal connection line of the vibration apparatus can be simplified and the degree of freedom in design of an apparatus can be enhanced, thereby decreasing the number of parts on the basis of simplification and reducing the manufacturing cost of an apparatus on the basis of process simplification.

The present disclosure encompasses various modifications to each of the examples and embodiments discussed herein. According to the disclosure, one or more features described above in one embodiment or example can be equally applied to another embodiment or example described above. The features of one or more embodiments or examples described above can be combined into each of the embodiments or examples described above. Any full or partial combination of one or more embodiment or examples of the disclosure is also part of the disclosure.

Various embodiments described herein may be implemented in a computer-readable medium using, for example, software, hardware, or some combination thereof. For example, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller. That is, the controller is a hardware-embedded processor executing the appropriate algorithms (e.g., flowcharts) for performing the described functions and thus has sufficient structure. Also, the embodiments such as procedures and functions may be implemented together with separate software modules each of which performs at least one of functions and operations. The software codes can be implemented with a software application written in any suitable programming language. Also, the software codes can be stored in the memory and executed by the controller, thus making the controller a type of special purpose controller specifically configured to carry out the described functions and algorithms. Thus, the components shown in the drawings have sufficient structure to implement the appropriate algorithms for performing the described functions.

The present disclosure being thus described, it will be obvious that the same may be varied in many ways. Such variations are not to be regarded as a departure from the spirit and scope of the present disclosure, and all such modifications as would be obvious to one skilled in the art are intended to be included within the scope of the following claims.

It will be apparent to those skilled in the art that various modifications and variations can be made in the apparatus of the present disclosure without departing from the technical idea or scope of the disclosure. Thus, it is intended that the present disclosure cover the modifications and variations of this disclosure provided they come within the scope of the appended claims and their equivalents.

What is claimed is:

1. An apparatus, comprising:
- a vibration member including a pad portion;
- a vibration apparatus configured to vibrate the vibration member;
- a pad connection member connected to the pad portion of the vibration member; and
- a vibration signal connection member connecting the vibration apparatus to the pad connection member.

2. The apparatus of claim 1, wherein the vibration apparatus is electrically connected to the pad portion through the pad connection member.

3. The apparatus of claim 1, wherein the vibration apparatus is electrically connected to the pad portion through the vibration signal connection member and the pad connection member.

4. The apparatus of claim 1, wherein the vibration apparatus does not directly contact the pad connection member.

5. The apparatus of claim 4, wherein the vibration apparatus is electrically connected to the pad connection member through the vibration signal connection member.

6. The apparatus of claim 1, wherein the vibration member comprises:
- a first vibration member disposed where the pad portion is disposed; and
- a second vibration member disposed where the vibration apparatus is disposed, the second vibration member being disposed on the first vibration member.

7. The apparatus of claim 6, wherein the pad connection member is disposed on the first vibration member.

8. The apparatus of claim 6, wherein the vibration signal connection member is disposed on the second vibration member.

9. The apparatus of claim 8, wherein the vibration signal connection member is disposed on the first vibration member and the second vibration member.

10. The apparatus of claim 1, wherein the vibration apparatus comprises:
- a vibration portion;
- a first electrode portion disposed on a first surface of the vibration portion; and
- a second electrode portion disposed on a second surface of the vibration portion, the second surface of the vibration portion being opposite to the first surface of the vibration portion.

11. The apparatus of claim 10, wherein the vibration portion includes a plurality of first portions and a plurality of second portions,
- wherein the plurality of first portions and the plurality of second portions are repeatedly and alternatively arranged,
- wherein the vibration portion is vibrated by the plurality of first portions and is bent in a curved shape by the plurality of second portions, and
- wherein the vibration signal connection member is electrically connected to each of the first electrode portion and the second electrode portion.

12. The apparatus of claim 10, wherein the vibration apparatus further comprises:
- a first cover member covering the first electrode portion;
- a second cover member covering the second electrode portion;
- a first power supply line disposed between the first electrode portion and the first cover member and electrically connected to the first electrode portion; and
- a second power supply line disposed between the second electrode portion and the second cover member and electrically connected to the second electrode portion, and
- wherein the vibration signal connection member is electrically connected to each of the first power supply line and the second power supply line.

13. The apparatus of claim 12, wherein the vibration signal connection member is formed through extension of the first and second power supply lines and the first and second cover members.

14. The apparatus of claim 13, wherein the pad portion includes a first pad electrode and a second pad electrode, and
- wherein the vibration signal connection member includes a first terminal electrically connected to the first pad electrode and a second terminal electrically connected to the second pad electrode.

15. The apparatus of claim 1, wherein the vibration member comprises one of a display panel including pixels configured to display an image, a lighting panel, a signage panel, and a mirror or comprises one of an interior material of a vehicle, a window of a vehicle, a ceiling of a building, an interior material of a building, a window of a building, an interior of an aircraft, and a window of an aircraft.

16. The apparatus of claim 1, wherein the vibration apparatus comprises two or more vibration devices spaced apart from one another.

17. An apparatus, comprising:
- a display panel configured to display an image and including a pad portion;
- a vibration apparatus configured to vibrate the display panel;
- a pad connection member connected to the pad portion; and
- a vibration signal connection member between the vibration apparatus and the pad connection member.

18. The apparatus of claim 17, wherein the display panel comprises:

a first substrate;

a pixel array portion disposed on the first substrate; and a second substrate disposed on the pixel array portion.

19. The apparatus of claim 18, wherein the pad portion is disposed on the first substrate, and wherein the pad connection member is connected to the pad portion.

20. The apparatus of claim 19, wherein the vibration apparatus is on the second substrate of the display panel, and wherein the vibration signal connection member is connected to the vibration apparatus.

21. The apparatus of claim 20, wherein the vibration signal connection member is disposed on the first substrate and the second substrate.

22. The apparatus of claim 17, further comprising:

a flexible film connected to the pad portion;

a source printed circuit board (PCB) connected to the flexible film and disposed at a first side of the display panel; and a cable connected to the source PCB, wherein the pad connection member is connected to the cable by the pad portion and the source PCB.

23. The apparatus of claim 22, wherein the flexible film comprises a signal transfer line connected to the pad portion, and wherein the pad connection member is connected to the signal transfer line by the pad portion.

24. The apparatus of claim 22, wherein the vibration apparatus is electrically connected to the pad connection member through the vibration signal connection member.

25. The apparatus of claim 17, wherein the display panel comprises a display area configured to display the image and a non-display area surrounding a periphery of the display area, wherein the pad connection member and the pad portion are at the non-display area, and wherein the vibrations signal connection member overlaps at least a portion of the display area.

* * * * *